US012763427B2

(12) United States Patent
Meng et al.

(10) Patent No.: US 12,763,427 B2
(45) Date of Patent: Oct. 13, 2026

(54) GAS-EXHAUSTING APPARATUS, BATTERY CELL, BATTERY AND ELECTRICITY-CONSUMING APPARATUS

(71) Applicant: CONTEMPORARY AMPEREX TECHNOLOGY (HONG KONG) LIMITED, Hong Kong (CN)

(72) Inventors: Wanqiu Meng, Ningde (CN); Qian Liu, Ningde (CN); Yonghuang Ye, Ningde (CN); Yulian Zheng, Ningde (CN); Longfei Xue, Ningde (CN); Xiaoxi Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 308 days.

(21) Appl. No.: 18/518,611

(22) Filed: Nov. 24, 2023

(65) Prior Publication Data

US 2024/0097272 A1 Mar. 21, 2024

Related U.S. Application Data

(63) Continuation of application No. PCT/CN2021/138924, filed on Dec. 16, 2021.

(51) Int. Cl.
*H01M 50/30* (2021.01)

(52) U.S. Cl.
CPC .................................. *H01M 50/394* (2021.01)

(58) Field of Classification Search
CPC .......................... H01M 50/394; H01M 50/367
See application file for complete search history.

(56) References Cited

U.S. PATENT DOCUMENTS 5,362,577 A * 11/1994 Pedicini ................ H01M 12/08
429/86
2012/0244420 A1* 9/2012 Serizawa ............ H01M 50/105
29/623.3

(Continued)

FOREIGN PATENT DOCUMENTS

CN 1168542 A 12/1997
CN 205542919 U 8/2016

(Continued)

OTHER PUBLICATIONS

Machine Translation Relied Upon for CN-113644351-A. (Year: 2021).*

(Continued)

*Primary Examiner* — Jennifer A Boyd
*Assistant Examiner* — Olivia A Jones
(74) *Attorney, Agent, or Firm* — ANOVA LAW GROUP, PLLC

(57) ABSTRACT

A gas-exhausting apparatus includes a gas-exhausting body and a gas-exhausting mechanism. The gas-exhausting mechanism includes a connecting assembly and a gas-ventilating member. The connecting assembly includes first and second connecting members. The first connecting member is provided with a first through hole for communicating with an inside of the battery cell. The second connecting member is provided with a second through hole for communicating with an outside of the battery cell. The first connecting member is configured to attach to a surface of the gas-ventilating member facing the inside of the battery cell.

(Continued)

The second connecting member is configured to attach to a surface of the gas-ventilating member facing away from the inside of the battery cell. An orthographic projection of the first through hole on the gas-ventilating member and an orthographic projection of the second through hole on the gas-ventilating member are arranged to be staggered from each other.

19 Claims, 10 Drawing Sheets

(56) References Cited

U.S. PATENT DOCUMENTS

| | | | | |
|---|---|---|---|---|
| 2013/0122336 | A1 | 5/2013 | Park et al. | |
| 2022/0077540 | A1 * | 3/2022 | Wakabayashi | H01M 50/394 |
| 2023/0318126 | A1 * | 10/2023 | Hwang | H01M 50/105 429/53 |

FOREIGN PATENT DOCUMENTS

| | | | | |
|---|---|---|---|---|
| CN | 208173641 | U | 11/2018 | |
| CN | 110391367 | A | 10/2019 | |
| CN | 111384348 | A | 7/2020 | |
| CN | 112133865 | A | 12/2020 | |
| CN | 212182380 | U | 12/2020 | |
| CN | 113644351 | A * | 11/2021 | H01M 50/105 |
| DE | 1046131 | B | 12/1958 | |
| EP | 3540815 | A1 * | 9/2019 | H01M 50/209 |
| JP | 2006125559 | A | 5/2006 | |
| WO | 2021040357 | A1 | 3/2021 | |

OTHER PUBLICATIONS

The World Intellectual Property Organization (WIPO) International Search Report for PCT/CN2021/138924 Sep. 14, 2022 7 pages (including English translation).

The European Patent Office (EPO) The Extended European Search Report for Application No. 21967704.4 Jul. 1, 2024 9 Pages.

* cited by examiner

GAS-EXHAUSTING APPARATUS, BATTERY CELL, BATTERY AND ELECTRICITY-CONSUMING APPARATUS

CROSS-REFERENCE TO RELATED APPLICATION

This application is a continuation of International Application No. PCT/CN2021/138924, filed on Dec. 16, 2021, the entire content of which is incorporated herein by reference.

TECHNICAL FIELD

The present application relates to the technical field of battery, and in particular to a gas-exhausting apparatus, a battery cell, a battery, an electricity-consuming apparatus, a method of manufacturing the gas-exhausting apparatus and a device of manufacturing the gas-exhausting apparatus.

BACKGROUND

Batteries are widely used in electronic devices, such as mobile phones, laptop computers, battery cars, electric cars, electric airplanes, electric ships, electric toy cars, electric toy ships, electric toy airplanes and electric tools and the like.

In the development of the battery technology, in addition to improving the performance of a battery cell, the safety issue is also a problem that should be considered. Therefore, how to improve the safety of the battery cell is an urgent problem to be solved in the battery technology.

SUMMARY

A gas-exhausting apparatus, a battery cell, a battery and an electricity-consuming apparatus are provided by the present application. The gas-exhausting apparatus can satisfy the release requirements of gas at an inside of the battery cell, and at the same time can ensure the safety performance of the battery cell.

In a first aspect, the gas-exhausting apparatus for a battery cell provided by the present application includes: a gas-exhausting body, and a gas-exhausting mechanism, including a connecting assembly and a gas-ventilating member arranged in the gas-exhausting body; the connecting assembly is configured to connect the gas-exhausting body; the connecting assembly includes a first connecting member and a second connecting member; the first connecting member is provided with a first through hole for communicating with an inside of the battery cell; the second connecting member is provided with a second through hole for communicating with an outside of the battery cell; the gas-ventilating member is configured to communicate with the first through hole and the second through hole and exhaust gas to the outside of the battery cell through the first through hole and the second through hole when a gas pressure of the inside of the battery cell reaches a threshold value. The first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other.

In the above technical solution, the gas-exhausting apparatus includes the gas-exhausting body and the gas-exhausting mechanism. The gas-exhausting mechanism includes the connecting assembly and the gas-ventilating member arranged in the gas-exhausting body. The connecting assembly includes the first connecting member and the second connecting member which are configured to connect with the gas-exhausting body. The first through hole on the first connecting member is communicated with the inside of the battery cell; the second through hole on the second connecting member is communicated with the outside of the battery cell. When the pressure of inside of the battery reaches the threshold value, the gas at the inside of the battery can be exhausted to the outside of the battery through the first through hole, the gas-ventilating member and the second through hole. Since the first through hole and the second through hole are arranged to be staggered, a region of the gas-ventilating member corresponding to the first through hole can be attached with the second connecting member, and a region of the gas-ventilating member corresponding to the second through hole can be attached with the first connecting member. Therefore, when the gas acts on the gas-ventilating member during the exhausting process, acting forces opposite to the gas pressure of the inside of the battery cell can be provided to the gas-ventilating member through the first connecting member and the second connecting member, respectively, so that it can reduce the probability of deformation or creep of the gas-ventilating member due to gas pressure during the exhausting process, reduce the failure risk of the gas-ventilating member due to the fatigue creep, and improve the safety performance and the reliability of the battery cell applying the gas-exhausting apparatus.

At the same time, through the above arrangement, when the gas-exhausting apparatus is working, even if the region of the gas-ventilating member corresponding to the first through hole or corresponding to the second through hole is scratched by a foreign object, since the region of the gas-ventilating member corresponding to the first through hole can be attached with the second connecting member, and the region of the gas-ventilating member corresponding to the second through hole can be attached with the first connecting member, a scratched position is less prone to creep damage. In addition, the scratched position is attached to the first connecting member or the second connecting member, so that it can reduce or avoid the risk of the electrolyte leakage failure of the inside of the battery cell.

In some embodiments, a plurality of first through holes are provided and distributed to be spaced apart from one another on the first connecting member, a first connecting portion is formed between two adjacent first through holes, and the first connecting portion is configured to attach to the surface of the gas-ventilating member facing the inside of the battery cell.

In the above technical solution, a plurality of first through holes are arranged to be spaced apart from one another on the first connecting member, so that it is beneficial to meet the gas-exhausting requirements of the inside of the battery cell. By forming the first connecting portion between the adjacent first through holes and attaching the first connecting portion to the surface of the gas-ventilating member facing the inside of the battery cell, when the gas at the inside the battery cell acts on the gas-ventilating member during the process of exhausting the gas through the gas-ventilating member to the outside of the battery cell, a pulling force may be provided to the gas-ventilating member through the first connecting portion, so that it can reduce the deformation of the gas-ventilating member, improve the internal-pressure-resisting ability of the whole gas-exhausting apparatus, and further improve the safety of the gas-exhausting apparatus.

In some embodiments, the first connecting member includes a first main body region and a first gas-exhausting region, the first main body region is configured to connect the gas-exhausting body, the first gas-exhausting region includes the plurality of first through holes and the first connecting portion, one part of the surface of the gas-ventilating member facing the inside of the battery cell is attached to the first main body region, the other part of the surface of the gas-ventilating member is attached to the first connecting portion, and an orthographic projection of at least one of the first main body region and the first connecting portion on the gas-ventilating member covers the orthographic projection of the second through hole on the gas-ventilating member.

In the above technical solution, the first connecting member includes the first main body region and the first gas-exhausting region. The first main body region can be connected to the gas-exhausting body, so that it can ensure the connecting strength between the first connecting member and the gas-exhausting body. The gas in the battery cell can be exhausted through the first gas-exhausting region, so that it can ensure the safety performance of the battery cell. Since one part of the gas-ventilating member is attached to the first main body region and the other part of the gas-ventilating member is attached to the first gas-exhausting region, that is, the gas-ventilating member is not only attached to the first connecting portion, but also attached to the first main body region, so that it can ensure the attachment strength between the gas-ventilating member and the first connecting member, and reduce the risk of separation of the gas-ventilating member from the first connecting member. In addition, the orthographic projection of at least one of the first main body region and the first connecting portion on the gas-ventilating member covers the orthographic projection of the second through hole on the gas-ventilating member, so that a region of the surface of the gas-ventilating member facing away from the second connecting member and corresponding to the second through hole can be attached to the first main body region or the first connecting portion, which can reduce the deformation of the gas-ventilating member under the gas pressure of the inside of the battery cell. Therefore, even if the region of the gas-ventilating member corresponding to the second through hole is scratched by the foreign object, the scratched position is less prone to creep damage. In addition, the scratched position is attached to the first connecting member, so that it can reduce or avoid the risk of the electrolyte leakage failure of the inside of the battery cell.

In some embodiments, a plurality of second through holes are provided and distributed to be spaced apart from one another on the second connecting member, a second connecting portion is formed between two adjacent second through holes, and the second connecting portion is configured to attach to the surface of the gas-ventilating member facing away from the inside of the battery cell.

In the above technical solution, the plurality of second through holes are distributed to be spaced apart from one another on the second connecting member, so that it is beneficial to meet the gas-exhausting requirements of the inside of the battery cell. By forming the second connecting portion between the adjacent second through holes and attaching the second connecting portion to the surface of the gas-ventilating member facing the inside of the battery cell, when the gas at the inside the battery cell acts on the gas-ventilating member during the process of exhausting the gas through the gas-ventilating member to the outside of the battery cell, a support force may be provided to the gas-ventilating member through the second connecting portion, so that it can reduce the deformation of the gas-ventilating member, improve the internal-pressure-resisting ability of the whole gas-exhausting apparatus, and further improve the safety of the gas-exhausting apparatus.

In some embodiments, the second connecting member includes a second main body region and a second gas-exhausting region, the second main body region is configured to connect the gas-exhausting body, the first gas-exhausting region includes the plurality of second through holes and the second connecting portion, one part of the gas-ventilating member facing away from the inside of the battery cell is attached to the second main body region, the other part of the gas-ventilating member is attached to the second connecting portion, and an orthographic projection of at least one of the second main body region and the second connecting portion on the gas-ventilating member covers the orthographic projection of the first through hole on the gas-ventilating member.

In the above technical solution, the second connecting member includes the second main body region and the second gas-exhausting region. The second main body region can be connected to the gas-exhausting body, so that it can ensure the connecting strength between the second connecting member and the gas-exhausting body. The gas in the battery cell can be exhausted through the second gas-exhausting region, so that it can ensure the safety performance of the battery cell. Since one part of the gas-ventilating member is attached to the second main body region and the other part of the gas-ventilating member is attached to the second gas-exhausting region, that is, the gas-ventilating member is not only attached to the second connecting portion, but also attached to the second main body region, so that it can ensure the attachment strength between the gas-ventilating member and the second connecting member, and reduce the risk of separation of the gas-ventilating member from the second connecting member. In addition, the orthographic projection of at least one of the second main body region and the second connecting portion on the gas-ventilating member covers the orthographic projection of the first through hole on the gas-ventilating member, so that a region of the surface of the gas-ventilating member facing away from the first connecting member and corresponding to the first through hole can be attached to the second main body region or the second connecting portion, which can reduce the deformation of the gas-ventilating member under the gas pressure of the inside of the battery cell. Therefore, even if the region of the gas-ventilating member corresponding to the first through hole is scratched by the foreign object, the scratched position is less prone to creep damage. In addition, the scratched position is attached to the second connecting member, so that it can reduce or avoid the risk of the electrolyte leakage failure of the inside of the battery cell.

In some embodiments, the gas-exhausting body is provided separately from the gas-exhausting mechanism, and the gas-exhausting mechanism is connected to the gas-exhausting body through at least one of the first connecting member and the second connecting member.

In the above technical solution, the gas-exhausting body and the gas-exhausting mechanism can be two independent portions. The gas-exhausting mechanism can be connected to the gas-exhausting body through one of the first connecting member and the second connecting member, or can be connected at the same time, so as to achieve the sealing effect with the different degrees. The independent and separated provision can flexibly process and arrange the gas-exhausting body and the gas-exhausting mechanism. In addition, the manner of separate forming enables the gas-exhausting body and the gas-exhausting mechanism to be processed and manufactured separately with different materials, so that the overall gas-exhausting apparatus can choose the appropriate material and processing technology according to the structural characteristics and the using requirements of the gas-exhausting mechanism.

In some embodiments, the gas-exhausting body includes a third through hole extending in an axial direction of the first through hole, and the third through hole is configured to accommodate at least a part of the gas-exhausting mechanism.

In the above technical solution, the gas-exhausting body includes the third through hole extending in an axial direction of the first through hole, and the third through hole is configured to accommodate at least a part of the gas-exhausting mechanism, so that it can reduce the occupied space of the overall gas-exhausting apparatus on the basis of satisfying the gas-exhausting requirements. The flexible assembly of the two independent apparatus of the gas-exhausting body and the gas-exhausting mechanism can be realized through the third through hole, the gas-exhausting mechanism can be positioned when is mounted, and the difficulty of assembly between the gas-exhausting mechanism and the gas-exhausting body can be reduced.

In some embodiments, the third through hole is a stepped hole, the third through hole includes a first hole segment, a second hole segment and a first stepped surface, the first stepped surface connects a hole wall of the first hole segment with a hole wall of the second hole segment, and the first stepped surface is configured to support one of the first connecting member and the second connecting member.

In the above technical solution, the third through hole is the stepped hole, the third through hole includes the first hole segment, the second hole segment and the first stepped surface, the first hole segment can accommodate one of the first connecting member and the second connecting member, and the second hole segment can accommodate the other one of the first connecting member and the second connecting member. The gas-ventilating member can be located at the first hole segment or the second hole segment. One of the first connecting member and the second connecting member can be supported by the first stepped surface, so that it can facilitate mounting and positioning the first connecting member, the gas-ventilating member and the second connecting member, and positioningly engaging the first connecting member, the gas-ventilating member and the second connecting member with the gas-ventilating body.

In some embodiments, the third through hole further includes a third hole segment and a second stepped surface, the second stepped surface connects the hole wall of the second hole segment with a hole wall of the third hole segment, and the second stepped surface is configured to support the other one of the first connecting member and the second connecting member.

In the above technical solution, the third through hole further includes the third hole segment and the second stepped surface, so that the whole gas-exhausting mechanism can be clampedly connected on the third hole segment. The second step surface is configured to support the other one of the first connecting member and the second connecting member, so that it can facilitate positioning the first connecting member and the second connecting member and connecting the first connecting member and the second connecting member with the gas-exhausting body.

In some embodiments, the gas-exhausting body includes a first concave portion concaved in an axial direction of the first through hole, one of the first connecting member and the second connecting member is formed on a bottom wall of the first concave portion, the gas-ventilating member is located in the first concave portion, and the other one of the first connecting member and the second connecting member is at least partially located in the first concave portion and provided separately from the gas-exhausting body.

In the above technical solution, the first connecting member or the second connecting member can be integrally formed with the gas-exhausting body as the bottom wall of the first concave portion of the gas-exhausting body. The integral forming can simplify the production process, save the cost of production materials, facilitate assembly with the gas-ventilating member, and further enhance the connection strength between the first connecting member or the second connecting member with the gas-exhausting body. The gas-ventilating member is located in the first concave portion, and the other one of the first connecting member and the second connecting member is at least partially located in the first concave portion and provided separately from the gas-exhausting body. The other one is separately formed and separately processed and assembled, so that it is beneficial to meet the requirements of mounting the gas-ventilating member and the attaching the first connecting member with the second connecting member.

In some embodiments, at least one of the first connecting member and the second connecting member is weldedly connected to the gas-exhausting body, and a gap is formed between the gas-ventilating member and the gas-exhausting body in a radial direction of the first through hole.

In the above technical solution, at least one of the first connecting member and the second connecting member is weldedly connected to the gas-exhausting body, so that it can ensure the connecting strength and the sealing performance between the gas-exhausting body and the first connecting member and/or the second connecting member. In addition, the gap is formed between the gas-ventilating member and the gas-exhausting body, so as to avoid forming a heat-conducting path between the gas-ventilating member and the gas-exhausting body, thereby preventing the heat generated during the welding process of the first connecting member and/or the second connecting member from being transferred to the gas-ventilating member and causing the damage of the gas-ventilating member.

In some embodiments, the gas-ventilating member includes a layer of gas-ventilating film, a surface of the gas-ventilating film facing the inside of the battery cell is attached to the first connecting member, and a surface of the gas-ventilating film facing away from the inside of the battery cell is attached to the second connecting member.

In the above technical solution, the gas-ventilating member can apply the layer of the gas-ventilating film to realize the airflow exchange between the inside and the outside of the battery, so that it can be convenient for production and has a good gas-ventilating effect.

In some embodiments, the gas-ventilating member includes a first gas-ventilating film, a second gas-ventilating film and a third gas-ventilating film arranged to be stacked with one another in an axial direction of the first through hole, a surface of the first gas-ventilating film facing the inside of the battery cell is attached to the first connecting member, a surface of the third gas-ventilating film facing away from the inside of the battery cell is attached to the second connecting member, and the gas-ventilating amount of the second gas-ventilating film is greater than the gas-ventilating amount of the first gas-ventilating film and the gas-ventilating amount of the third gas-ventilating film.

In the above technical solution, the surface of the first gas-ventilating film facing the inside of the battery cell is attached to the first connecting member, the surface of the third gas-ventilating film facing away from the inside of the battery cell is attached to the second connecting member, so that the attachment of two or more layers of the gas-ventilating film can increase the gas tightness of the gas-exhausting mechanism, make the contact of the gas-ventilating film, prevent liquid leakage, and improve the reliability of the gas-exhausting mechanism. The gas-ventilating amount of the second gas-ventilating film is greater than the gas-ventilating amount of the first gas-ventilating film and the gas-ventilating amount of the third gas-ventilating film, so that it can make up for the gas-ventilating obstruction caused by the staggered arrangement of the first through hole and the second through hole, improve the flexibility of the gas-ventilating design, and ensure that the gas at the inside of the battery cell can be effectively and quickly exhausted to the outside.

In some embodiments, a melting point of the second gas-ventilating film is higher than a melting point of the first gas-ventilating film and a melting point of the third gas-ventilating film.

In the above technical solution, the melting point of the second gas-ventilating film is arranged to be higher than the melting points of the other two gas-ventilating films, so that the second gas-ventilating film has a better thermoset property, so that it can prevent an aperture edge of the gas-ventilating film from collapsing when the gas-ventilating film is attached to the first connecting member and the second connecting member by a thermal composite, and the second gas-ventilating film can provide support and fixing in the middle well.

In some embodiments, two or more layers of the second gas-ventilating films are provided, the two or more layers of the second gas-ventilating films are located between the first gas-ventilating film and the third gas-ventilating film, and the two or more layers of second gas-ventilating films are stacked in the axial direction.

In the above technical solution, two or more second gas-ventilating films are stacked with one another in the axial direction between the first gas-ventilating film and the third gas-ventilating film, so that it can satisfy the requirements of different gas-ventilating amounts, thermoset properties and thicknesses of the gas-ventilating mechanism, and can effectively improve the flexibility of gas-ventilating design.

In some embodiments, the gas-ventilating member is connected to at least one of the first connecting member and the second connecting member through a chemical bond.

In the above technical solution, the gas-ventilating member can be connected to at least one of the first connecting member and the second connecting member through the chemical bond, so that it can improve the bonding strength between the gas-ventilating member and the first connecting member and/or the second connecting member, and the attachment between each other can be more firm and stable. In addition, the connection by the chemical bond is adopted, so that it can prevent the electrolyte from passing through an attachment gap formed between the gas-ventilating member and the first connecting member or the second connecting member, thereby avoiding the contact or immersion of the electrolyte with a port of the gas-ventilating member, and avoiding the swelling of the gas-ventilating member.

In some embodiments, a second concave portion is provided on one of the first connecting member and the second connecting member, the second concave portion is formed by depressing a surface of one of the first connecting member and the second connecting member in a direction away from the other one, the gas-ventilating member is at least partially accommodated in the second concave portion, and each of a bottom wall and a side wall of the second concave portion abuts against the gas-ventilating member.

In the above technical solution, the second concave portion is provided on one of the first connecting member and the second connecting member, the gas-ventilating member is placed in the second concave portion, each of the bottom wall and the side wall of the second concave portion abuts against the gas-ventilating member, and the second concave portion partially surrounds the gas-ventilating member, so that it can facilitate the positioning of the gas-ventilating member, and prevent the gas-ventilating member from moving in the radial direction of the first through hole. Thus, the gas-ventilating member does not need to be directly connected to the gas-exhausting body, only at least one of the first connecting member and the second connecting member need to be weldedly connected to the gas-exhausting body, so that it can simplify the assembly and connection process, the gas-ventilating member can be better fixed in the second concave portion, so as to make it more stable. Furthermore, an assembly structure can be provided for the integral gas-exhausting mechanism, which can facilitate flexible design and assembly.

In some embodiments, an accommodating cavity is formed at an inside of the gas-exhausting body, the gas-exhausting body includes a plurality of walls defining the accommodating cavity, and at least one of the walls is provided with the gas-exhausting mechanism.

In the above technical solution, the accommodating cavity is formed at the inside of the gas-exhausting body, the gas-exhausting body includes the plurality of walls defining the accommodating cavity, and at least one of the walls is provided with the gas-exhausting mechanism, that is, the gas-exhausting apparatus may be a housing structure capable of accommodating an electrode assembly, and the gas-exhausting apparatus integrates the functions of accommodating and gas-exhausting.

In some embodiments, the gas-exhausting body is an end cover of the battery cell.

In the above technical solution, the gas-exhausting body is the end cover of the battery cell, that is, the gas-exhausting mechanism may be the end cover provided at the battery cell.

In a second aspect, a battery cell provided by the present application includes the gas-exhausting apparatus according to any one of embodiments in the first aspect.

In a third aspect, a battery provided by the present application includes the battery cell according to any one of embodiments in the second aspect, and a housing body configured to accommodate the battery cell.

In a fourth aspect, an electricity-consuming apparatus provided by the present application includes the battery according to any one of embodiments in the third aspect, and the battery is configured to provide an electric power.

In a fifth aspect, a method of manufacturing a gas-exhausting apparatus provided by the present application includes: providing a gas-exhausting body; and providing a gas-exhausting mechanism, and connecting the gas-exhausting mechanism to the gas-exhausting body. Herein, the gas-exhausting mechanism includes a connecting assembly and a gas-ventilating member; the connecting assembly is configured to connect the gas-exhausting body; the connecting assembly includes a first connecting member and a second connecting member; the first connecting member is provided with a first through hole for communicating with an inside of the battery cell; the second connecting member is provided with a second through hole for communicating with an outside of the battery cell; the gas-ventilating member is configured to communicate with the first through hole and the second through hole and exhaust gas to the outside of the battery cell through the first through hole and the second through hole when a gas pressure of the inside of the battery cell reaches a threshold value; the first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other.

In a sixth aspect, a device of manufacturing a gas-exhausting apparatus provided by the present application includes: a providing apparatus, configured to provide a gas-exhausting body; and a assembling apparatus, configured to provide a gas-exhausting mechanism and connect the gas-exhausting mechanism to the gas-exhausting body. Herein, the gas-exhausting mechanism includes a connecting assembly and a gas-ventilating member; the connecting assembly is configured to connect the gas-exhausting body; the connecting assembly includes a first connecting member and a second connecting member; the first connecting member is provided with a first through hole for communicating with an inside of the battery cell; the second connecting member is provided with a second through hole for communicating with an outside of the battery cell; the gas-ventilating member is configured to communicate with the first through hole and the second through hole and exhaust gas to the outside of the battery cell through the first through hole and the second through hole when a gas pressure of the inside of the battery cell reaches a threshold value; the first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other.

The above description is only an overview of the technical solution of the present application. In order to understand the technical means of the present application more clearly, it can be implemented according to the contents of the description. In addition, in order to make the above and other objects, features and advantages of the present application more obvious and understandable, the specific embodiments of the present application are enumerated below.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
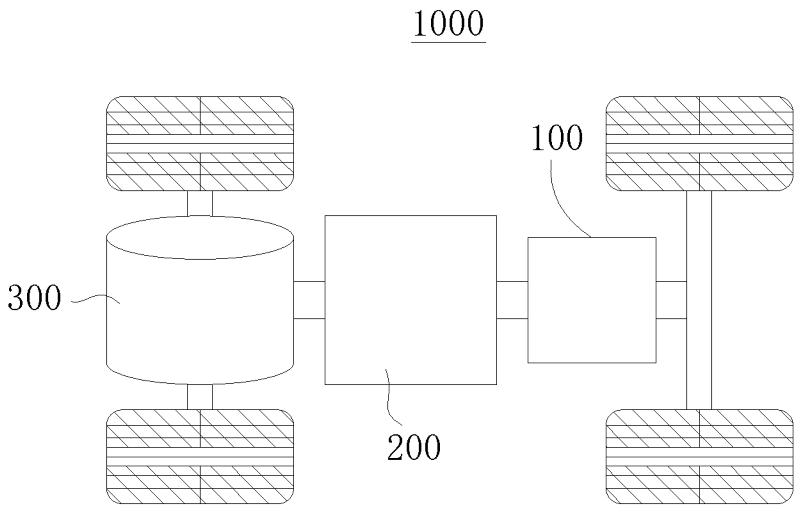
FIG. 1 shows a structural schematic view of a vehicle according to some embodiments of the present application.

In the drawings, the drawings are not necessarily drawn to actual scale.

In the drawings:

1000—vehicle;

100—battery; 200—controller; 300—motor;

10—box body; 11—first portion; 12—second portion;
20—battery cell;
21—housing body;
22—electrode assembly; 221—positive electrode tab; 222—negative electrode tab;
23—end cover; 231—positive electrode terminal; 232—negative electrode terminal;
24—gas-exhausting apparatus;
241—gas-exhausting body;
2411—first concave portion;
2412—third through hole; 2412*a*—first hole segment; 2412*b*—second hole segment; 2412*c*—third hole segment; 2412*d*—first stepped surface; 2412*e*—second stepped surface;
2413—second concave portion; 2414—accommodating cavity; 2415*a*—bottom wall; 2415*b*—side wall;
242—gas-exhausting mechanism; 2421—connecting assembly; 2421*a*—first connecting member; 2421*b*—second connecting member;
24211—first main body region; 24212—first gas-exhausting region; 24213—second gas-exhausting region; 24214—second gas-exhausting region;
2422—gas-ventilating member; 2422*a*—first gas-ventilating film; 2422*b*—second gas-ventilating film; 2422*c*—third gas-ventilating film;
2423—first through hole; 2424—second through hole; 2425—first connecting portion; 2426—second connecting portion;
2100—providing apparatus; 2200—assembling apparatus; X-axial direction.

In the drawings, the same portions are given the same reference numerals. The drawings are not drawn to actual scale.

DETAILED DESCRIPTION

In order to make the objects, technical solutions and advantages of the embodiments of the present application more clear, the technical solutions of the embodiments of the present application will be clearly and completely described below in conjunction with the drawings of the embodiments of the present application. It is apparent that the described embodiments are a part of the embodiments of the present application, and not all of them. Based on the described embodiments of the present application, all other embodiments obtained by those skilled in the art fall within the scope of the application.

Unless otherwise defined, technical terms or scientific terms used in the present disclosure should be interpreted according to common meanings thereof as commonly understood by those of ordinary skills in the art. The terms used in the description in the present application are only for the purpose of describing specific embodiments and are not intended to limit the present application. The terms "including" and "having" in the description and the claims of the present application and the above description of the drawings, and any variations thereof are intended to cover non-exclusive inclusions. The terms "first", "second", etc. in the description and the claims of the present application or the above-mentioned drawings are used to distinguish different objects, rather than to describe a specific order or a primary-secondary relationship.

The "embodiments" referred to in the present application means that specific features, structures or characteristics described in conjunction with the embodiments may be included in at least one embodiment of the present application. This word appeared in various places in the description does not necessarily refer to the same embodiment, nor is it an independent or alternative embodiment mutually exclusive with other embodiments.

In the description of the present application, it should be noted that, unless otherwise clearly specified and limited, the terms "mount", "connecting" and "connection" and "attach" should be understood in a broad sense, for example, it can be a fixed connection, a detachable connection, or an integral connection, it can be connected directly, it can be connected indirectly through an intermedium, or it can be a communication between two elements at insides thereof. For those of ordinary skill in the art, the specific meaning of the above-mentioned terms in the present application can be understood according to specific situations.

The term "and/or" in the present application is merely an association relationship describing associated objects, which means that there can be three types of relationships. For example, "A and/or B" can mean three cases that there is only A, there are A and B at the same time, and there is only B. In addition, the punctuation mark "/" in the present application generally indicates that the related objects of the preceding content and following content are in an "or" relationship. In this disclosure, the phrases "at least one of A, B, and C" and "at least one of A, B, or C" both mean only A, only B, only C, or any combination of A, B, and C.

In the embodiments of the present application, the same reference numerals denote the same components, and for the sake of brevity, in different embodiments, detailed descriptions of the same components are omitted. It should be understood that the thickness, length, width and other dimensions of the various components in the embodiments of the present application shown in the drawings, as well as the overall thickness, length and width, etc., of the integrated device are only exemplary descriptions, and should not constitute any limitation to the present application.

The "plurality" in the present application refers to two or more (including two).

In the present application, a battery cell may include a lithium ion secondary battery cell, a lithium ion primary battery cell, a lithium sulfur battery cell, a sodium lithium ion battery cell, a sodium ion battery cell or a magnesium ion battery cell, etc., which is not limited in the embodiment of the present application. The battery cell can be in a shape of cylinder, flat shape, rectangular, or other shapes, which is not limited in the embodiments of the present application. There are generally three types of the battery cell in terms of packaging manners: cylindrical battery cell, square battery cell, and soft-packed battery cell, which are not limited in the embodiments of the present application.

A battery mentioned in the embodiments of the present application refers to a single physical module that includes one or more battery cells to provide higher voltage and capacity. The battery generally includes a housing for packaging one or more battery cells. The housing can prevent liquid or other foreign objects from affecting the charging or discharging of the battery cells.

The battery cell includes an electrode assembly and an electrolyte, and the electrode assembly includes a positive electrode sheet, a negative electrode sheet and a separator. The battery cell mainly relies on the movement of metal ions between the positive electrode sheet and the negative electrode sheet to work. The positive electrode sheet includes a positive electrode current collector and a positive electrode active material layer. The positive electrode active material layer coats on a surface of the positive electrode current collector. The positive electrode current collector includes a positive electrode current collecting portion and a positive electrode tab protruding from the positive electrode current collecting portion. The positive electrode current collecting portion is coated with the positive electrode active material layer, and at least part of the positive electrode tab is not coated with the positive electrode active material layer. Taking a lithium ion battery as an example, a material of the positive electrode current collector may be aluminum, the positive electrode active material layer includes a positive electrode active material, and the positive electrode active material may be lithium cobaltate, lithium iron phosphate, ternary lithium, lithium manganite or the like. The negative electrode sheet includes a negative electrode current collector and a negative electrode active material layer. The negative electrode active material layer coats on a surface of the negative electrode current collector. The negative electrode current collector includes a negative electrode current collecting portion and a negative electrode tab protruding from the negative electrode current collecting portion. The negative electrode current collecting portion is coated with the negative electrode active material layer, and at least part of the negative electrode tab is not coated with the negative electrode active material layer. A material of the negative electrode current collector may be copper, the negative electrode active material layer includes the negative electrode active material, and the negative electrode active material may be carbon or silicon, etc. In order to ensure that a large current is passed without fusing, the number of the positive electrode tabs is multiple, and the positive electrode are stacked together; the number of the negative electrode tabs is multiple, and the negative electrode tabs are stacked together. A material of the separator may be PP (polypropylene) or PE (polyethylene), etc. In addition, the electrode assembly may be a winding-type structure or a laminated-type structure, which is not limited in the embodiments of the present application.

The development of battery technology should consider various design factors, such as the performance parameters: energy density, cycle operation life, discharge capacity, charge-discharge rate and the like, at the same time. In addition, the safety of the battery also needs to be considered.

In the battery cell, after many charge and discharge cycles, there are side reactions, and the gas is continuously generated, so that there is a certain gas pressure of the inside of the battery cell. As the gas pressure increases, the gas between the electrode sheets cannot be exhausted in time, which will affect the intercalation and extraction of lithium ions, and lead to the risk of lithium precipitation. In order to ensure the safety of the battery cell, a gas-exhausting apparatus is generally provided in the battery cell, and the gas generated from the inside of the battery cell is exhausted through the gas-exhausting apparatus, so as to ensure the safety of the battery cell.

The inventors found that even if the gas-exhausting apparatus is provided in the battery cells, there is still a risk of fire and explosion of the battery cell. The inventor further researched and found that during the process of the battery cell exhausting the gas generated from the inside of the battery cell through the gas-exhausting apparatus, the gas-ventilating member in the gas-exhausting apparatus has no support structure or only has a support structure at one side of a gas-exhausting direction. When the gas pressure of the inside of the battery cell reaches a predetermined threshold, the gas can be exhausted from the battery cell through the gas-ventilating member. The gas will act on the gas-ventilating member during the gas-exhausting process, so that the gas-ventilating member will be deformed easily, thereby causing the risk of creep failure in long-term operation, accelerating the aging of the gas-ventilating member, and reducing the reliability of the product finally.

In view of this, a gas-exhausting apparatus is provided by embodiments of the present application. A connecting assembly and a gas-ventilating member are arranged on a gas-exhausting body. The connecting assembly includes a first connecting member and a second connecting member; the first connecting member is provided with a first through hole for communicating with an inside of the battery cell; the second connecting member is provided with a second through hole for communicating with an outside of the battery cell; the gas-ventilating member is configured to communicate with the first through hole and the second through hole and exhaust gas to the outside of the battery cell through the first through hole and the second through hole when the gas pressure of the inside of the battery cell reaches a threshold value. The first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other.

In the case that such the gas-exhausting apparatus is applied for the battery cell, when he pressure of inside of the battery reaches the threshold value, the gas at the inside of the battery can be exhausted to the outside of the battery through the first through hole, the gas-ventilating member and the second through hole. Since the first through hole and the second through hole are arranged to be staggered, a region of the gas-ventilating member corresponding to the first through hole can be attached with the second connecting member, and a region of the gas-ventilating member corresponding to the second through hole can be attached with the first connecting member. Therefore, when the gas acts on the gas-ventilating member during the exhausting process, acting forces opposite to the gas pressure of the inside of the battery cell can be provided to the gas-ventilating member through the first connecting member and the second connecting member, respectively, so that it can reduce the probability of deformation or creep of the gas-ventilating member due to gas pressure during the exhausting process, reduce the failure risk of the gas-ventilating member due to the fatigue creep, and improve the safety performance and the reliability of the battery cell applying the gas-exhausting apparatus.

The gas-exhausting apparatus described in the embodiments of the present application is applicable to a battery cell, a battery, and an electricity-consuming apparatus and device applying the battery.

The electric device may be a vehicle, a mobile phone, a portable device, a notebook computer, a ship, a spacecraft, an electric toy, an electric tool or the like. The vehicle may be a fuel car, a gas car or a new energy car, and the new energy car can be a pure electric car, a hybrid car, a range-extended car or the like; the spacecraft may include an airplane, a rocket, a space shuttle, a space ship or the like; the electric toy may include a fixed-type or mobile-type electric toy, such as a game player, an electric car toy, an electric ship toy, an electric airplane toy or the like; the power tool may include a metal cutting power tool, a grinding power tool, an assembly power tool and a railway power tools, such as an electric drill, an electric grinder, an electric wrench, an electric screwdriver, an electric hammer, an impact drill, a concrete vibrator, an electric planers or the like. The embodiments of the present application do not impose special limitation on the above-mentioned electric devices.

For convenience of description, the following embodiments take the vehicle selected from the electric device as an example for description.

Referring to FIG. 1, FIG. 1 shows a structural schematic view of a vehicle 1000 according to some embodiments of the present application. A battery 100 can be arranged at an inside of the vehicle 1000, and the battery 100 may be arranged at a bottom, a front portion or a back portion of the vehicle 1000. The battery 100 can be configured to supply power to the vehicle 1000, for example, the battery 100 can be used as an operating power source of the vehicle 1000.

The vehicle 1000 may further include a controller 200 and a motor 300. The controller 200 is configured to control the battery 100 to supply power to the motor 300, for example, the controller 200 can be configured to satisfy the working power requirements during starting, navigating and driving of the vehicle 1000.

In some embodiments of the present application, the battery 100 can not only be used as an operating power source for the vehicle 1000, but can also be used as a driving power source for the vehicle 1000, replacing or partially replacing the fuel or the natural gas to provide driving power for the vehicle 1000.

Figure 2:
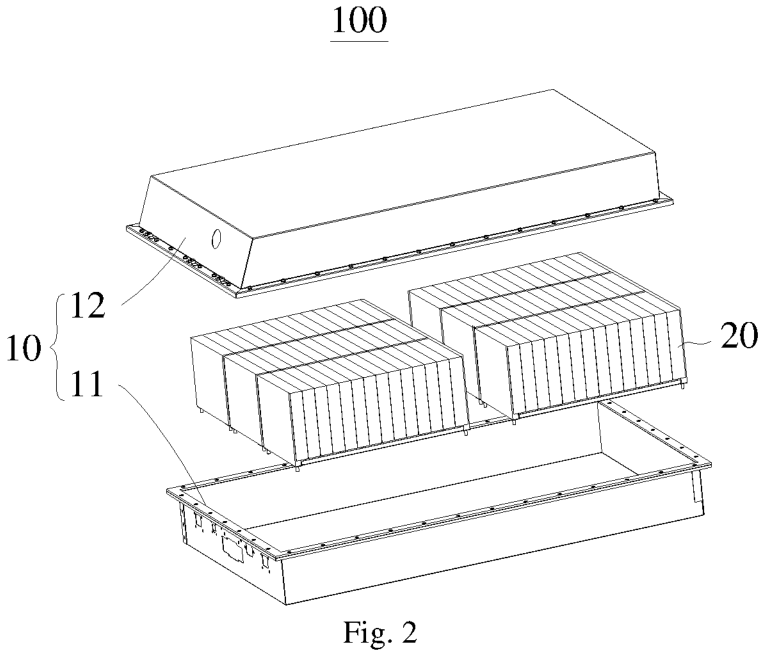
FIG. 2 shows a structural schematic view of a battery according to some embodiments of the present application.

Referring to FIG. 2, FIG. 2 shows a structural schematic view of the battery 100 according to some embodiments of the present application. The battery 100 includes a box body 10 and a battery cell 20, and the box body 10 is configured to accommodate the battery cell 20.

The box body 10 is a portion for accommodating the battery cell 20, the box body 10 provides an accommodating space for the battery cell 20, and the box body 10 can adopt various structures. In some embodiments, the box body 10 may include a first portion 11 and a second portion 12. The first portion 11 and the second portion 12 may cover with each other to define the accommodating space for accommodating the battery cell 20. The first portion 11 and the second portion 12 can be in various shapes, such as cuboid, cylinder and the like. The first portion 11 can be a hollow structure with an open side, and the second portion 12 can also be a hollow structure with an open side, and the open side of the second portion 12 can cover with the open side of the first portion 11 to form the box body 10 with the accommodating space. It is also possible that the first portion 11 is the hollow structure with the open side, and the second portion 12 is a plate-shape structure, and the second portion 12 can cover with the open side of the first portion 11 to form the box body 10 with the accommodating space. The first portion 11 and the second portion 12 can be sealed by a sealing element, and the sealing element can be a sealing ring, a sealant or the like.

In the battery 100, there may be one or a plurality of battery cells 20. If there are the plurality of battery cells 20, the plurality of battery cells 20 can be connected in series, in parallel or in mixed. The mixed connection means that the plurality of battery cells 20 may include the connection in series and the connection in parallel. The plurality of battery cells 20 may be connected in series, in parallel or in mixed to form the battery module firstly, and then the plurality of battery modules are connected in series, in parallel or in mixed to form a whole, and accommodated in the box body 10. It is also possible that all the battery cells 20 are directly connected in series, in parallel or in combination together, and then all the battery cells 20 are accommodated in the box body 10 as a whole.

Figure 3:
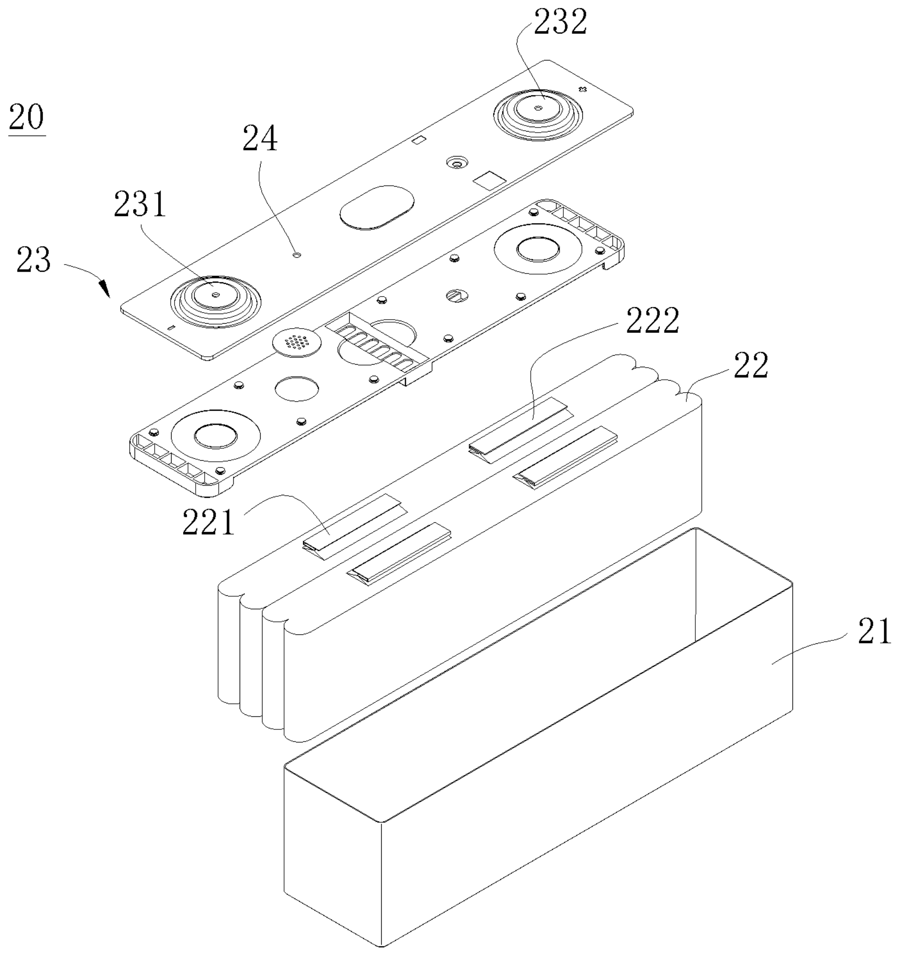
FIG. 3 shows an exploded schematic view of a battery cell according to some embodiments of the present application.

Referring to FIG. 3, FIG. 3 shows an exploded schematic view of the battery cell 20 according to some embodiments of the present application. The battery cell 20 includes an end cover 23, an electrode assembly 22, a housing body 21, and a gas-exhausting apparatus 24.

The housing body 21 may be a portion for accommodating the electrode assembly 22, and the housing body 21 may be a hollow structure with an opening formed at an end. The housing body 21 may be in various shapes, such as cylinder, cuboid and the like. The housing body 21 can be made of various materials, such as a copper, an iron, an aluminum, a steel, an aluminum alloy and the like.

There may be one or more electrode assemblies 22 in the housing body 21. For example, as shown in FIG. 3, there are a plurality of electrode assemblies 22, and the plurality of electrode assemblies 22 can be arranged to be stacked with one another.

The electrode assembly 22 is a portion where the electrochemical reaction occurs in the battery cell 20. The electrode assembly 22 may include a positive electrode sheet, a negative electrode sheet and a separating film. The electrode assembly 22 may be a coiled structure formed by winding the positive electrode sheet, the separating film and the negative electrode sheet, or a stacked structure formed by stacking the positive electrode sheet, the separating film and the negative electrode sheet.

The positive electrode sheet may include a positive electrode current collector and a positive electrode active material layer coating on two sides of the positive electrode current collector opposite to each other. The negative electrode sheet may include a negative electrode current collector and a negative electrode active material layer coating on two sides of the negative electrode current collector opposite to each other. The electrode assembly 22 includes a positive electrode tab 221 and a negative electrode tab 222. The positive electrode tab 221 may be a part of the positive electrode sheet not coated with the positive active material layer, and the negative electrode tab 222 may be a part of the negative electrode sheet not coated with the negative active material layer.

The end cover 23 may be a portion covering an opening of the housing body 21 to isolate an internal environment of the battery cell 20 from the external environment of the battery cell 20. The end cover 23 covers the opening of the housing body 21. The end cover 23 and the housing body 21 jointly define a sealing space for accommodating the electrode assembly 22, the electrolyte and other portions. A shape of the end cover 23 can be adapted to a shape of the housing body 21, for example, the housing body 21 may be a cuboid structure, and the end cover 23 may be a rectangular plate-shaped structure adapted to the housing body 21; for another example, the housing body 21 may be a cylindrical structure, and the end cover 23 may be a circular plate-shaped structure adapted to the housing body 21. The material of the end cover 23 can also be various, for example, a copper, an iron, an aluminum, a steel, an aluminum alloy or the like. The material of the end cover 23 and the material of the housing body 21 can be the same or different.

An electrode terminal can be arranged on the end cover 23, and the electrode terminal can be configured to be electrically connected with the electrode assembly 22 to output the electric energy of the battery cell 20. The electrode terminal may include a positive electrode terminal 231 and a negative electrode terminal 232, the positive electrode terminal 231 is configured to be electrically connected with the positive electrode tab 221, and the negative electrode terminal 232 is configured to be electrically connected with the negative electrode tab 222. The positive electrode terminal 231 and the positive electrode tab 221 can be connected directly or indirectly; the negative electrode terminal 232 and the negative electrode tab 222 can be connected directly or indirectly.

The gas-exhausting apparatus 24 is a portion for exhausting the gas at an inside of the battery cell 20. When the gas pressure of the inside of the battery cell 20 reaches a first threshold, the gas at the inside of the battery cell 20 is exhausted through the gas-exhausting apparatus 24. The specific structure of the gas-exhausting apparatus 24 will be described in detail below with reference to the drawings.

Figure 4:
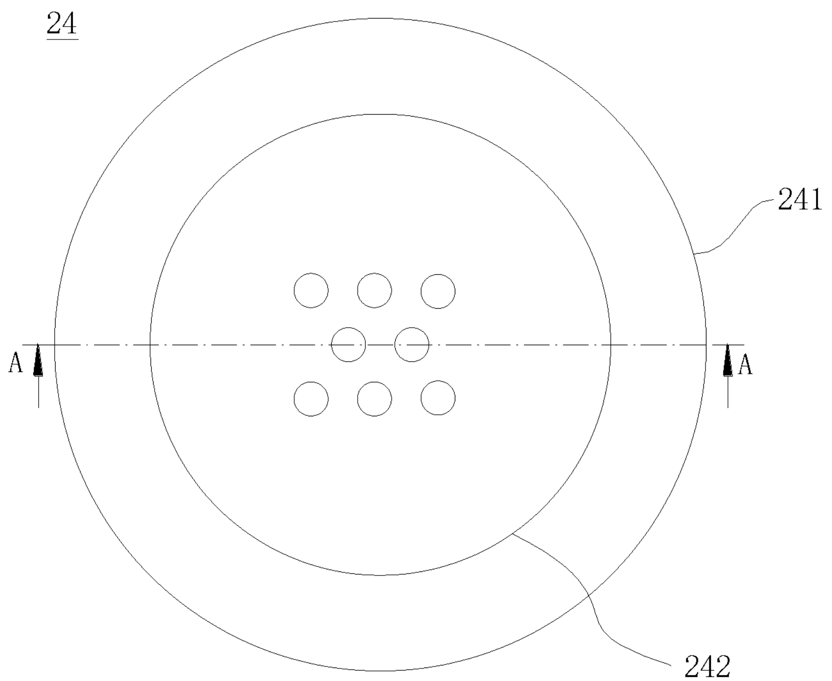
FIG. 4 shows a top view of a gas-exhausting apparatus according to some embodiments of the present application.
Figure 5:
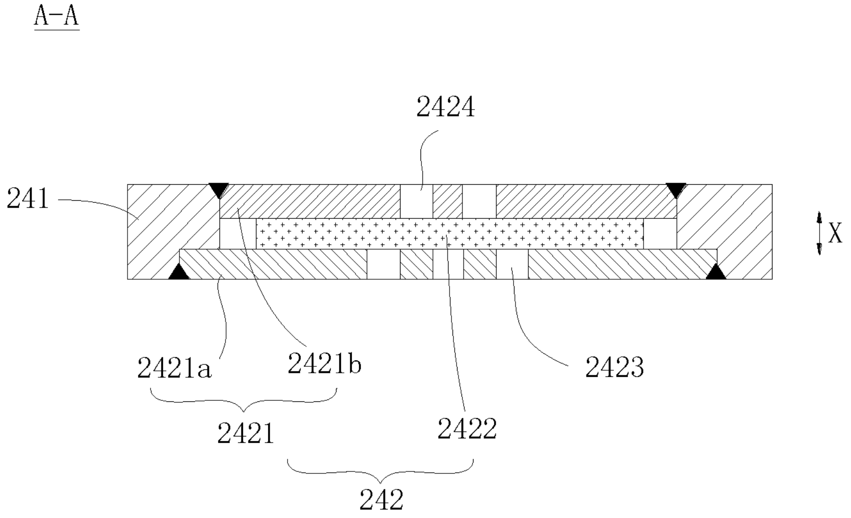
FIG. 5 shows a sectional view in an A-A direction in FIG. 4.

Referring to FIG. 4 and FIG. 5, FIG. 4 shows a top view of the gas-exhausting apparatus 24 according to some embodiments of the present application, and FIG. 5 shows a sectional view in an A-A direction in FIG. 4. The gas-exhausting apparatus 24 for a battery cell 20 is provided by the present application. The gas-exhausting apparatus 24 includes a gas-exhausting body 241 and a gas-exhausting mechanism 242. The gas-exhausting mechanism 242 includes a connecting assembly 2421 and a gas-ventilating member 2422 arranged in the gas-exhausting body 241; the connecting assembly 2421 is configured to connect the gas-exhausting body 241; the connecting assembly 2421 includes a first connecting member 2421*a* and a second connecting member 2421*b*; the first connecting member 2421*a* is provided with a first through hole 2423 for communicating with an inside of the battery cell; the second connecting member 2421*b* is provided with a second through hole 2424 for communicating with an outside of the battery cell; the gas-ventilating member 2422 is configured to communicate with the first through hole 2423 and the second through hole 2424 and exhaust gas to the outside of the battery cell through the first through hole 2423 and the second through hole 2424 when a gas pressure of the inside of the battery cell reaches a threshold value. The first connecting member 2421*a* is configured to attach to a surface of the gas-ventilating member 2422 facing the inside of the battery cell, the second connecting member 2421*b* is configured to attach to a surface of the gas-ventilating member 2422 facing away from the inside of the battery cell, and an orthographic projection of the first through hole 2423 on the gas-ventilating member 2422 and an orthographic projection of the second through hole 2424 on the gas-ventilating member 2422 are arranged to be staggered from each other.

The gas-exhausting body 241 may be a portion mounted on the end cover 23. For example, the gas-exhausting apparatus 24 is a plate-shaped structure mounted on the end cover 23. The gas-exhausting body 241 may also be the end cover 23 for covering the electrode assembly 22. Exemplarily, the end cover 23 is the gas-exhausting body 241. The gas-exhausting body 241 may also be the housing body 21 for accommodating the electrode assembly 22. Exemplarily, the housing body 21 is the gas-exhausting body 241, and the connecting assembly 2421 of the gas-exhausting mechanism 242 can be connected to the housing body 21.

The connecting assembly 2421 and the gas-exhausting body 241 may at least partially adopt an integral structure. Of course, the connecting assembly 2421 and the gas-exhausting body 241 may also adopt split structures. When the split structures are adopted, the connecting assembly 2421 and the gas-exhausting body 241 can be fixedly connected by means of welding or the like.

The number of the first through holes 2423 included in the first connecting member 2421*a* may be two, three or more. The number of the second through holes 2424 included in the second connecting member 2421*b* may be two, three or more, and the present application does not limit the specific number.

The shape of the first through hole 2423 may be a regular geometric shape, such as a circle, an ellipse or a regular polygon. Of course, the shape of the first through hole 2423 may also be an irregular geometric shape, which is not limited in the present application. The shape of the second through hole 2424 can be a regular geometric shape, such as a circle, an ellipse or a regular polygon. Of course, the shape of the second through hole 2424 may also be an irregular geometric shape, which is not limited in the present application.

The shapes of the plurality of first through holes 2423 may be the same, for example, each of the plurality of first through holes 2423 may be circular, elliptical, or waist-circle-shaped. Of course, the shapes of the plurality of first through holes 2423 may be different, or at least part of the first through holes 2423 may have different shapes, for example, a part of the first through holes 2423 among the plurality of first through holes 2423 may be circular, and a part of the first through holes 2423 may be oval, waist-circle-shaped or polygonal. Similarly, the shapes of the plurality of second through holes 2424 may be the same. Of course, the shapes of the second through holes 2424 may also be different, or at least part of the first through holes 2424 may have different shapes, which will not be repeated here.

The number of the first through holes 2423 and the number of the second through holes 2424 may be the same, of course, may be different. Moreover, the parameters such as the shape and the size of the first through hole 2423 and the shape and the size of the second through hole 2424 may be the same or different.

The first through hole 2423 and the second through hole 2424 can be formed in various ways, such as stamping, milling or the like, which is not particularly limited in the embodiments of the present application.

A distribution pattern of the plurality of first through holes 2423 on the first connecting member 2421*a* is not specifically limited. For example, the distribution pattern may be a row-and-column distribution or an array distribution, or a sequential distribution along a circular track, and of course, a sequential distribution along a straight line track or a curved track. The plurality of second through holes 2424 are arranged to be staggered vertically from the first through holes 2423 respectively. The orthographic projection of each of the second through holes 2424 on the gas-ventilating member 2422 is staggered from the orthographic projection of each of first through-holes 2423 on the gas-ventilating member 2422.

The gas-ventilating member 2422 has a ventilation function, and the material of the gas-ventilating member 2422 can be PP (polypropylene, polypropylene), PE (polyethylene, polyethylene), and PU (polyurethane, polyurethane). The gas at the inside of the battery cell 20 needs to pass through the gas-ventilating member 2422 when being exhausted. The gas-ventilating member 2422 can allow the gas at the inside of the battery cell 20 to flow to the outside of the battery cell 20, and can block the water vapor at the outside of the battery cell 20 from entering the inside of the battery cell 20.

Attachment may mean that a portion a and a portion b abut against each other, of course, it may also mean that the portion a and the portion b are in contact and connected with each other, and there is a connection force between the two part. Specifically, in the gas-exhausting apparatus 24 provided by the embodiments of the present application, taking the portion a being the first connecting member 2421*a* and the portion b being the gas-ventilating member 2422 as an example, the first connecting member 2421*a* attaching to the surface of the gas-ventilating member 2422 facing the inside of the battery cell 20 can be understood as the first connecting member 2421*a* pressing against the surface of the gas-ventilating member 2422 facing the inside of the battery cell 20 and contact with each other, and the first connecting member 2421*a* and the gas-ventilating member 2422 may not be connected with each other but merely abutted against each other. Certainly, the first connecting member 2421*a* and the gas-ventilating member 2422 may be connected to each other and have a connecting force between each other. When there is the connecting force between each other, for example, a chemical bond connection, an adhesion connection and other manners can be used as the connection. The second connecting member 2421*b* attaching to the surface of the gas-ventilating member 2422 facing away from the inside of the battery cell can be in the same manner as above, and will not be repeated here.

The orthographic projection of the first through hole 2423 on the gas-ventilating member 2422 and the orthographic projection of the second through hole 2424 on the gas-ventilating member 2422 are arranged to be staggered from each other, so that the orthographic projection of each first through hole 2423 on the gas-ventilating member 2422 does not overlap with the orthographic projection of each second through hole 2424 on the gas-ventilating member 2422.

In the above technical solution, the gas-exhausting mechanism 242 includes the connecting assembly 2421 and the gas-ventilating member 2422 arranged at the gas-exhausting body 241, the connecting assembly 2421 includes the first connecting member 2421*a* and the second connecting member 2421*b* for connecting the gas-exhausting body 241, so that it can make the connection between the connecting assembly 2421 and the gas-exhausting body 241 more stable, so as to ensure the stability and the sealing performance. The first connecting member 2421*a* is provided with the first through hole 2423 for communicating with the inside of the battery cell, and the second connecting member 2421*b* is provided with the second through hole 2424 for communicating with the outside of the battery cell. The ventilation member 2422 is configured to communicate with the first through hole 2423 and the second through hole 2424 and exhaust the gas to the outside of the battery cell through the first through hole 2423 and the second through hole 2424 when the gas pressure of the inside the battery cell reaches the threshold value, so as to achieve the purpose of exhausting the gas at the inside of the battery cell 20.

Since the first through hole 2423 and the second through hole 2424 are arranged to be staggered, a region of the gas-ventilating member 2422 corresponding to the first through hole 2423 can be attached with the second connecting member 2421*b*, and a region of the gas-ventilating member 2422 corresponding to the second through hole 2424 can be attached with the first connecting member 2421*a*. Therefore, when the gas acts on the gas-ventilating member 2422 during the exhausting process, acting forces opposite to the gas pressure of the inside of the battery cell can be provided to the gas-ventilating member 2422 through the first connecting member 2421*a* and the second connecting member 2421*b*, respectively, so that it can reduce the probability of deformation or creep of the gas-ventilating member 2422 due to gas pressure during the exhausting process, reduce the failure risk of the gas-ventilating member 2422 due to the fatigue creep, and improve the safety performance and the reliability of the battery cell applying the gas-exhausting apparatus.

At the same time, through the above arrangement, when the gas-exhausting apparatus 24 is working, even if the region of the gas-ventilating member 2422 corresponding to the first through hole 2423 or corresponding to the second through hole 2424 is scratched by a foreign object, since the region of the gas-ventilating member 2422 corresponding to the first through hole 2423 can be attached with the second connecting member 2421*b*, and the region of the gas-ventilating member 2422 corresponding to the second through hole 2424 can be attached with the first connecting member 2421*a*, a scratched position is less prone to creep damage. In addition, the scratched position is attached to the first connecting member 2421*a* or the second connecting member 2421*b*, so that it can reduce or avoid the risk of the electrolyte leakage failure of the inside of the battery cell.

Figure 6:
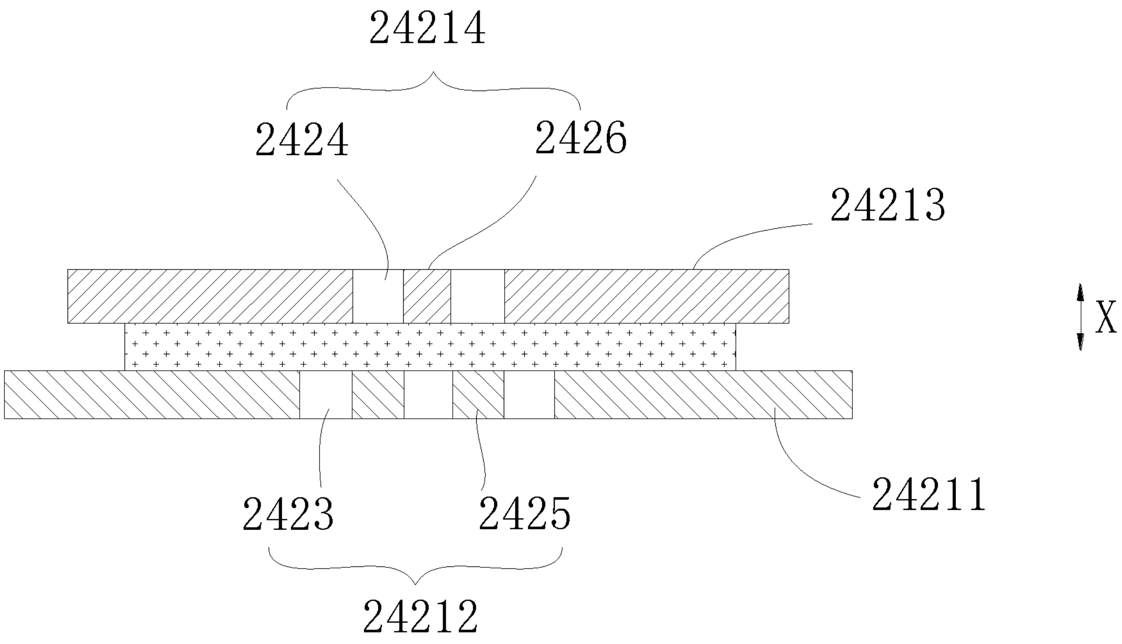
FIG. 6 shows a schematic view of cooperation between a gas-exhausting member and a connecting assembly according to some embodiments of the present application.

Referring to FIG. 6, in some embodiments, a plurality of first through holes 2423 are provided and distributed to be spaced apart from one another on the first connecting member 2421*a*, a first connecting portion 2425 is formed between two adjacent first through holes 2423, and the first connecting portion 2425 is configured to attach to the surface of the gas-ventilating member 2422 facing the inside of the battery cell.

Hole walls of two adjacent first through holes 2423 are at least partially spaced apart from each other. The first connecting portion 2425 is a region where the first connecting member 2421*a* is located between two adjacent first through holes 2423. In any direction perpendicular to the axial direction X of the first through hole 2423, the first connecting portion 2425 may be formed between each two adjacent first through holes 2423.

The first connecting portion 2425 is attached to the gas-ventilating member 2422. The gas-ventilating member 2422 may contact with and abut against the connecting portion 2425. The gas-ventilating member 2422 and the first connecting portion 2425 may be connected to each other by means of the adhesion connection or the chemical bond connection.

A plurality of first through holes 2423 are arranged to be spaced apart from one another on the first connecting member 2421*a*, so that it is beneficial to meet the gas-exhausting requirements of the inside of the battery cell. By forming the first connecting portion 2425 between the adjacent first through holes 2423 and attaching the first connecting portion 2425 to the surface of the gas-ventilating member 2422 facing the inside of the battery cell 20, when the gas at the inside the battery cell acts on the gas-ventilating member 2422 during the process of exhausting the gas through the gas-ventilating member 2422 to the outside of the battery cell 20, a pulling force may be provided to the gas-ventilating member 2422 through the first connecting portion 2425, so that it can reduce the deformation of the gas-ventilating member 2422, improve the internal-pressure-resisting ability of the whole gas-exhausting apparatus 24, and further improve the safety of the gas-exhausting apparatus 24.

In some embodiments, the first connecting member 2421*a* includes a first main body region 24211 and a first gas-exhausting region 24212, the first main body region 24211 is configured to connect the gas-exhausting body 241, the first gas-exhausting region 24212 includes the plurality of first through holes 2423 and the first connecting portion 2425, one part of the surface of the gas-ventilating member 2422 facing the inside of the battery cell is attached to the first main body region 24211, the other part of the surface of the gas-ventilating member 2422 is attached to the first connecting portion 2425, and an orthographic projection of at least one of the first main body region 24211 and the first connecting portion 2425 on the gas-ventilating member 2422 covers the orthographic projection of the second through hole 2424 on the gas-ventilating member 2422.

The first main body region 24211 and the first gas-exhausting region 24212 of the first connecting member 2421*a* can be of an integral structure or a split structure. The integral structure can be selected, so that it can ensure the connection strength between the first main body region 24211 and the first gas-exhausting region 24212 and facilitate the forming of the first connecting portion 2421*a*.

The first main body region 24211 may be arranged around the first gas-exhausting region 24212. An outer periphery of the first main body region 24211 may be connected with the gas-exhausting body 241. Optionally, the first main body region 24211 can be fixedly connected to the gas-exhausting body 241 by means of welding, or can be flexibly connected to the gas-exhausting body 241 in other manners. On the premise of ensuring the gas tightness of the inside of the battery, the present application does not specifically limit the connection manner between the first main body region 24211 and the first gas-exhausting region 24212.

Since one part of the gas-ventilating member 2422 is attached to the first main body region 24211 and the other part of the gas-ventilating member 2422 is attached to the first gas-exhausting region 24212, that is, the gas-ventilating member 2422 is not only attached to the first connecting portion 2425, but also attached to the first main body region 24211, so that it can ensure the attachment strength between the gas-ventilating member 2422 and the first connecting member 2421*a*, and reduce the risk of separation of the gas-ventilating member 2422 from the first connecting member 2421*a*.

Each of the plurality of first through holes 2423 and the first connecting portion 2421*a* can be arranged in the first gas-exhausting region 24212. The gas-ventilating member 2422 is not only attached to the first connecting portion 2421*a* of the gas-exhausting region 24212, but also attached to the first main body region 24211, so that it can ensure the attachment strength between the gas-ventilating member 2422 and the first connecting member 2421*a*, and reduce the risk of separation of the gas-ventilating member 2422 from the first connecting member 2421*a*.

The orthographic projection of at least one of the first main body region 24211 and the first connecting portion 2425 on the gas-ventilating member 2422 covers the orthographic projection of the second through hole 2424 on the gas-ventilating member 2422, so that a region of the surface of the gas-ventilating member 2422 facing away from the second connecting member 2421*b* and corresponding to the second through hole 2424 can be attached to the first main body region 24211 or the first connecting portion 2425, which can reduce the deformation of the gas-ventilating member 2422 under the gas pressure of the inside of the battery cell 20. Therefore, even if the region of the gas-ventilating member 2422 corresponding to the second through hole 2424 is scratched by the foreign object, the scratched position is less prone to creep damage. In addition, the scratched position is attached to the first connecting member, so that it can reduce or avoid the risk of the electrolyte leakage failure of the inside of the battery cell.

Continue to refer to FIG. 6, in some embodiments, a plurality of second through holes 2424 are provided and distributed to be spaced apart from one another on the second connecting member 2421*b*, a second connecting portion 2426 is formed between two adjacent second through holes 2424, and the second connecting portion 2426 is configured to attach to the surface of the gas-ventilating member 2422 facing away from the inside of the battery cell.

In the above technical solution, the plurality of second through holes 2424 are distributed to be spaced apart from one another on the second connecting member 2421*b*, so that it is beneficial to meet the gas-exhausting requirements of the inside of the battery cell 20. By forming the second connecting portion 2426 between the adjacent second through holes 2424 and attaching the second connecting portion 2426 to the surface of the gas-ventilating member 2422 facing the inside of the battery cell 20, when the gas at the inside the battery cell 20 acts on the gas-ventilating member 2422 during the process of exhausting the gas through the gas-ventilating member 2422 to the outside of the battery cell, a support force may be provided to the gas-ventilating member 2422 through the second connecting portion 2426, so that it can reduce the deformation of the gas-ventilating member 2422, improve the internal-pressure-resisting ability of the whole gas-exhausting apparatus 24, and further improve the safety of the gas-exhausting apparatus.

The first connecting portion 2425 cooperates with the second connecting portion 2426 to jointly fix the gas-ventilating member 2422 in the middle, so that the deformation or creep of the gas-ventilating member 2422 caused by the gas pressure of the inside of the battery cell can be alleviated.

In some embodiments, the second connecting member 2421*b* includes a second main body region 24213 and a second gas-exhausting region 24214, the second main body region 24213 is configured to connect the gas-exhausting body 241, the first gas-exhausting region 24214 includes the plurality of second through holes 2424 and the second connecting portion 2426, one part of the gas-ventilating member 2422 facing away from the inside of the battery cell is attached to the second main body region 24213, the other part of the gas-ventilating member 2422 is attached to the second connecting portion 2426, and an orthographic projection of at least one of the second main body region 24213 and the second connecting portion 2426 on the gas-ventilating member 2422 covers the orthographic projection of the first through hole 2423 on the gas-ventilating member 2422.

The connection manner between the second main body region 24213 and the gas-exhausting body 241 can refer to the above connection manner of the first main body region 24211.

In the above technical solution, the second connecting member 2421*b* includes the second main body region 24213 and the second gas-exhausting region 24214. The second main body region 24213 can be connected to the gas-exhausting body 241, so that it can ensure the connecting strength between the second connecting member 2421*b* and the gas-exhausting body 241.

The gas in the battery cell 20 can be exhausted through the second gas-exhausting region 24214, so that it can ensure the safety performance of the battery cell 20. Since one part of the gas-ventilating member 2422 is attached to the second main body region 24213 and the other part of the gas-ventilating member 2422 is attached to the second gas-exhausting region 24214, that is, the gas-ventilating member 2422 is not only attached to the second connecting portion 2426, but also attached to the second main body region 24213, so that it can ensure the attachment strength between the gas-ventilating member 2422 and the second connecting member 2421*b*, and reduce the risk of separation of the gas-ventilating member 2422 from the second connecting member 2421*b*.

In addition, the orthographic projection of at least one of the second main body region 24213 and the second connecting portion 2426 on the gas-ventilating member 2422 covers the orthographic projection of the first through hole 2423 on the gas-ventilating member 2422, so that a region of the surface of the gas-ventilating member 2422 facing away from the first connecting member 2421*a* and corresponding to the first through hole 2423 can be attached to the second main body region 24213 or the second connecting portion 2426, which can reduce the deformation of the gas-ventilating member 2422 under the gas pressure of the inside of the battery cell 20. Therefore, even if the region of the gas-ventilating member 2422 corresponding to the first through hole 2423 is scratched by the foreign object, the scratched position is less prone to creep damage. In addition, the scratched position is attached to the second connecting member 2421*b*, so that it can reduce or avoid the risk of the electrolyte leakage failure of the inside of the battery cell.

In some embodiments, the gas-exhausting body 241 is provided separately from the gas-exhausting mechanism 242, and the gas-exhausting mechanism 242 is connected to the gas-exhausting body 241 through at least one of the first connecting member 2421*a* and the second connecting member 2421*b*.

Providing the gas-exhausting body 241 and the gas-exhausting mechanism 242 separately may mean that the gas-exhausting body 241 and the gas-exhausting mechanism 242 are two independent components before being assembled and can be produced and processed separately. When the two components are assembled together, the gas-exhausting mechanism 242 can be connected to the gas-exhausting body 241 through the first connecting member 2421*a* or the second connecting member 2421*b*.

In the above technical solution, the gas-exhausting body 241 and the gas-exhausting mechanism 242 can be two independent portions, so that it is convenient for processing and assembling. In addition, the manner of separate forming enables the gas-exhausting body 241 and the gas-exhausting mechanism 242 to be processed and manufactured separately with different materials, so that the overall gas-exhausting apparatus can choose the appropriate material and processing technology according to the structural characteristics and the using requirements of the gas-exhausting mechanism 242.

Figure 7:
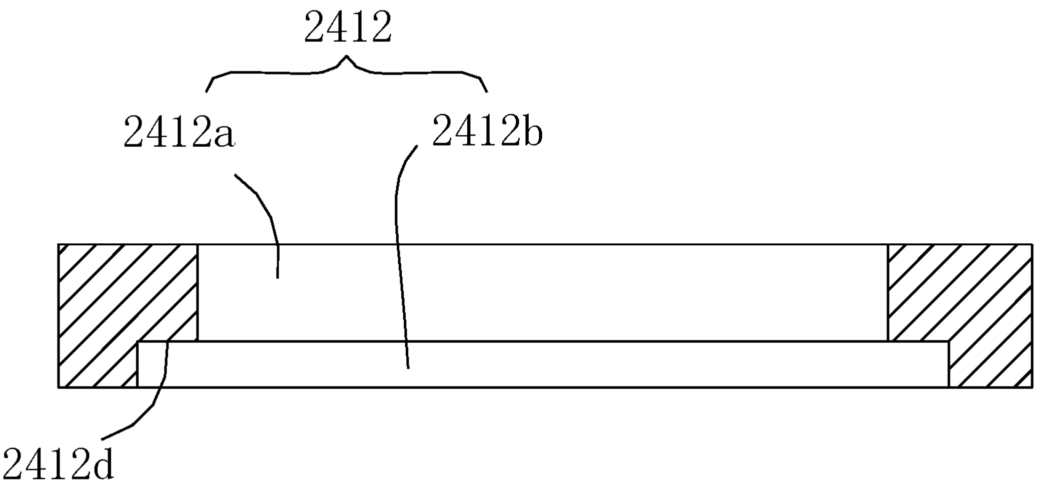
FIG. 7 shows a partial structural schematic view of a gas-exhausting according to some embodiments of the present application.

Referring to FIG. 7, in some embodiments, the gas-exhausting body 241 includes a third through hole 2412 extending in an axial direction X of the first through hole 2423, and the third through hole 2412 is configured to accommodate at least a part of the gas-exhausting mechanism 242.

The gas-exhausting mechanism 242 may be partially located in the third through hole 2412, or may be entirely located in the third through hole 2421.

The third through hole 2412 can be arranged with a constant cross-section in the axial direction X, and of course, can be arranged with a variable cross-section. In some optional embodiments, when the cross-section is variable, the third through hole 2412 may also be in the form of a stepped hole.

The shape and configuration of the third through hole 2412 can be adapted to the outer contour of the gas-exhausting mechanism 242, which can facilitate the mounting of the gas-exhausting mechanism 242 and the sealing connection between the gas-exhausting mechanism 242 and the third through hole 2412.

The gas-exhausting apparatus 24 is provided by the embodiments of the present application. The gas-exhausting body 241 includes the third through hole 2412 extending in the axial direction X of the first through hole 2423, and the third through hole 2412 is configured to accommodate at least a part of the gas-exhausting mechanism 242, so that it can reduce the occupied space of the overall gas-exhausting apparatus 24 on the basis of satisfying the gas-exhausting requirements. The flexible assembly of the two independent apparatus of the gas-exhausting body 241 and the gas-exhausting mechanism 242 can be realized through the third through hole 2421, the gas-exhausting mechanism 242 can be positioned when is mounted, and the difficulty of assembly between the gas-exhausting mechanism 242 and the gas-exhausting body 241 can be reduced.

In some embodiments, the third through hole 2412 may be the stepped hole, the third through hole 2412 includes a first hole segment 2412*a*, a second hole segment 2412*b* and a first stepped surface 2412*d*, the first stepped surface 2412*d* connects a hole wall of the first hole segment 2412*a* with a hole wall of the second hole segment 2412*b*, and the first stepped surface 2412*d* is configured to support one of the first connecting member 2421*a* and the second connecting member 2421*b*.

The radial size of the first hole segment 2412*a* may be greater than the radial size of the second hole segment 2412*b*, and of course may also be smaller than the radial size of the second hole segment 2412*b*. The first stepped surface 2412*d* can be configured to support the first connecting member 2421*a*, and certainly can also be configured to support the second connecting member 2421*b*.

The gas-exhausting apparatus 24 is provided by the embodiments of the present application. According to the above technical solution, it can facilitate mounting and positioning the first connecting member 2421*a*, the gas-ventilating member 2422 and the second connecting member 2421*b*, and positioningly engaging the first connecting member 2421*a*, the gas-ventilating member 2422 and the second connecting member 2421*b* with the gas-ventilating body 241.

The third through hole 2412 can be formed in various ways, such as stamping, milling or the like, which is not particularly limited in the embodiments of the present application.

Optionally, referring to FIG. 5 to FIG. 7, the radial size of the first hole segment 2412*a* may be smaller than the radial size of the second hole segment 2412*b*, the second hole segment 2412*b* is arranged close to the inside of the battery cell 20, and the first hole segment 2412*a* is located at a side of the second hole segment 2412*b* away from the inside of the battery cell 20. The first stepped surface 2412*d* can be configured to support the first connecting member 2421*a*.

It can be understood that the above-mentioned arrangement provides a possibility of a stacking structure in the third through hole 2412, and there may also be various collocation and combination.

Figure 8:
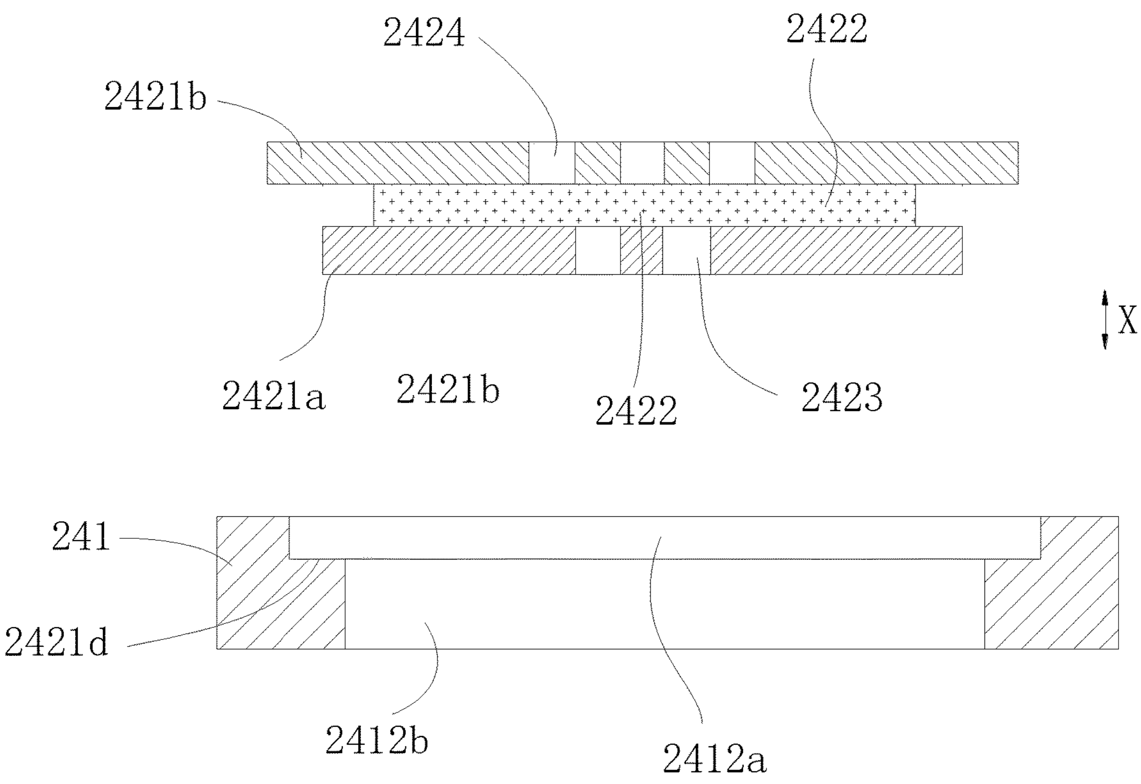
FIG. 8 shows an exploded view of a gas-exhausting apparatus according to another embodiments of the present application.

Referring to FIG. 8, in some other optional embodiments, the radial size of the first hole segment 2412*a* may be greater than the radial size of the second hole segment 2412*b*, the second hole segment 2412*b* may be arranged close to the inside of the battery cell, and the first hole segment 2412*a* is located at the side of the second hole segment 2412*b* away from the inside of the battery cell 20. The first stepped surface 2412*d* can be configured to support the second connecting member 2421*b*.

Figure 9:
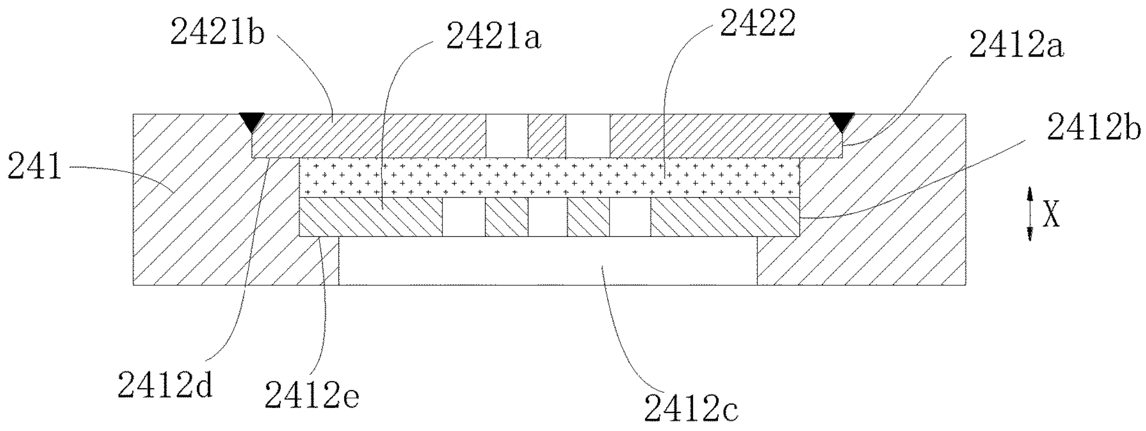
FIG. 9 shows a cross-sectional view of a gas-exhausting apparatus according to another embodiments of the present application.

Referring to FIG. 9, in some embodiments, the third through hole 2412 further includes a third hole segment 2412*c* and a second stepped surface 2412*e*, the second stepped surface 2412*e* connects the hole wall of the second hole segment 2412*b* with a hole wall of the third hole segment 2412*c*, and the second stepped surface 2412*e* is configured to support the other one of the first connecting member 2421*a* and the second connecting member 2421*b*.

In some other optional embodiments, the third hole segment 2412*c* may be arranged at a side of the second hole segment 2412*b* facing the inside of the battery cell 20, the radial size of the third hole segment 2412*c* may be smaller than the smallest radial size of the region of the gas-exhausting mechanism 242, the second stepped surface 2412*e* may support a part of the gas-exhausting mechanism 242, and the second stepped surface 2412*e* and the gas-exhausting mechanism 242 may be arranged to be stacked with each other.

The gas-exhausting apparatus 24 is provided by the embodiments of the present application. The third through hole 2412 further includes the third hole segment 2412*c* and the second stepped surface 2412*e*, so that the whole gas-exhausting mechanism 242 can be clampedly connected on the third hole segment 2412. The second step surface 2412*e* is configured to support the other one of the first connecting member 2421*a* and the second connecting member 2421*b*, so that it can facilitate positioning the first connecting member 2421*a* and the second connecting member 2421*b* and connecting the first connecting member 2421*a* and the second connecting member 2421*b* with the gas-exhausting body 241.

Figure 10:
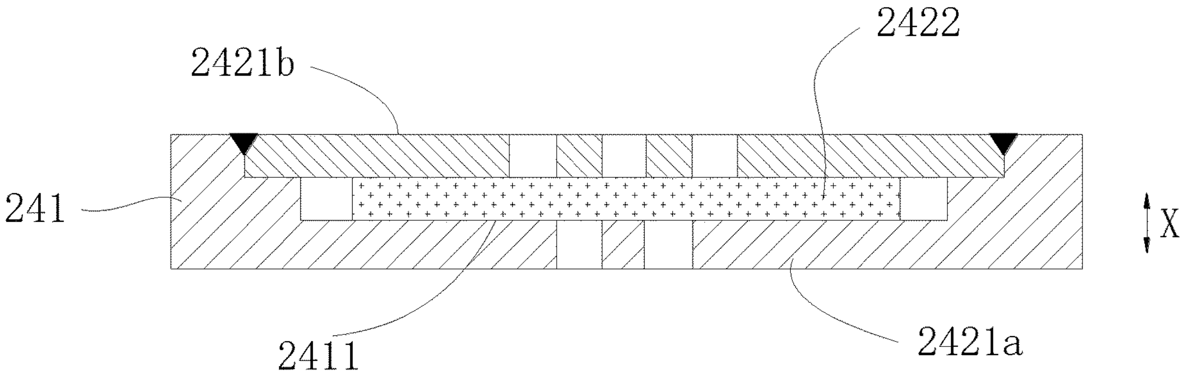
FIG. 10 shows a cross-sectional view of a gas-exhausting apparatus according to another embodiments of the present application.
Figure 11:
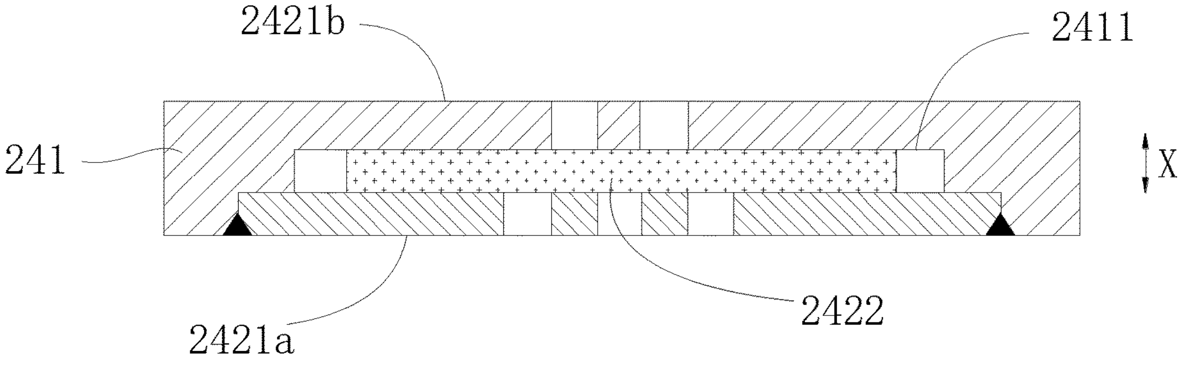
FIG. 11 shows a cross-sectional view of a gas-exhausting apparatus according to another embodiments of the present application.

Referring to FIG. 10 and FIG. 11, in some embodiments, the gas-exhausting body 241 includes a first concave portion 2411 concaved in the axial direction X of the first through hole 2423, one of the first connecting member 2421*a* and the second connecting member 2421*b* is formed on a bottom wall of the first concave portion 2411, the gas-ventilating member 2422 is located in the first concave portion 2411, and the other one of the first connecting member 2421*a* and the second connecting member 2421*b* is at least partially located in the first concave portion 2411 and provided separately from the gas-exhausting body 241.

The first concave portion 2411 is formed by removing a part of the material on the gas-exhausting body 241. When the gas-exhausting apparatus is applied to the battery cell 20, the first concave portion 2411 may be arranged to face the electrode assembly 22, and of course may also be arranged to face away from the electrode assembly 22.

The shape of the orthographic projection of the first concave portion 2411 may be a circle, an ellipse, a polygon or the like, which will be not specifically limited in the present application.

The gas-exhausting mechanism 242 may be partially located in the first concave portion 2411, of course, the gas-exhausting mechanism 242 may also be entirely located in the first concave portion 2411.

As shown in FIG. 10, the first connecting member 2421*a* can be formed on the bottom wall of the first concave portion 2411, the second connecting member 2421*b* can be partially located in the first concave portion 2411, the second connecting member 2421*b* and the gas-exhausting body 241 can be separately provided, and the first concave portion 2411 may be formed by concaving the surface of the gas-exhausting body 241 facing away from the inside of the battery cell 20 in the axial direction X of the first through hole 2423. Of course, in an optional embodiment, as shown in FIG. 11, the second connecting member 2421*b* can be formed on the bottom wall of the first concave portion 2411. Thus, the first connecting member 2421*a* can be partly located in the first concave portion 2411, the first connecting member 2421*a* and the gas-exhausting body 241 can be separately provided, and the first concave portion 2411 may be formed by concaving the surface of the gas-exhausting body 241 facing and close to the inside of the battery cell 20 in the axial direction X of the first through hole 2423.

By providing the gas-exhausting body 241 and the first connecting member 2421*a* or second connecting member 2421*b* separately, the gas-exhausting body 241 and the first connecting member 2421*a* or the second connecting member 2421*b* can be regarded as two independent components before being assembled, and can be produced and processed separately. The gas-exhausting mechanism 242 and the gas-exhausting body 241 can be connected through the connecting assembly 2421 when assembled together. Optionally, the first concave portion 2411 may be of multi-stepped, so that it can facilitate the positioning of the first connecting member 2421*a* or the second connecting member 2421*b* in the axial direction X of the first through hole 2423.

In the above technical solution, the first connecting member 2421*a* or the second connecting member 2421*b* can be integrally formed with the gas-exhausting body 241, so that it can save the technological process, the cost of production materials and a certain assembling space. The first concave portion 2411 which is formed also can provide an accommodating space for the gas-ventilating member 2422. The other one of the first connecting member 2421*a* and the second connecting member 2421*b* and the gas-exhausting body 241 can be provided separately, so that each of the gas-exhausting body 241 and the other one of the first connecting member 2421*a* and the second connecting member 2421*b* can be an independent component, and it is convenient for processing and assembling. In addition, the manner of separate forming enables the gas-exhausting body 241 and the gas-exhausting mechanism 242 to be processed and manufactured separately with different materials, so that the overall gas-exhausting apparatus can choose the appropriate material and processing technology according to the structural characteristics and the using requirements of the gas-exhausting mechanism 242.

Referring to FIG. 10 and FIG. 11, in some embodiments, at least one of the first connecting member 2421*a* and the second connecting member 2421*b* can be weldedly connected to the gas-exhausting body 241, and a gap is formed between the gas-ventilating member 2422 and the gas-exhausting body 241 in a radial direction of the first through hole 2423.

Optionally, the first connecting member 2421*a* or the second connecting member 2421*b* may be welded to the gas-exhausting body 241, and of course each of the first connecting member 2421*a* and the second connecting member 2421*b* may be welded to the gas-exhausting body 241. The gas-exhausting mechanism 242 can be sealingly connected with the gas-exhausting body 241 to realize the sealing of the inside of the battery. Optionally, the welded connection can be laser welded connection.

Exemplarily, when one of the first connecting member 2421*a* and the second connecting member 2421*b* is formed on the bottom wall of the first concave portion 2411, the other of the first connecting member 2421*a* and the second connecting member 2421*b* can be welded to the gas-exhausting body 241. When the first connecting member 2421*a* and the second connecting member 2421*b* are provided separately to the gas-exhausting body 241, the first connecting member 2421*a* and the second connecting member 2421*b* can be respectively weldedly connected to the gas-exhausting body 241.

When each of the first connecting member 2421*a* and the second connecting member 2421*b* is weldedly connected to the gas-exhausting body 241, it can ensure the connecting strength and the sealing performance between the gas-exhausting body 241 and the first connecting member 2421*a* and/or the second connecting member 2421*b*, the probability of failure due to product leakage can be reduced, and the double protection against leakage can be formed. In addition, the gap can be formed between the gas-ventilating member 2422 and the gas-exhausting body 241, so as to avoid forming a heat-conducting path between the gas-ventilating member 2422 and the gas-exhausting body 241, thereby preventing the heat generated during the welding process of the first connecting member 2421*a* and/or the second connecting member 2421*b* from being transferred to the gas-ventilating member 2422 and causing the damage of the gas-ventilating member 2422.

Referring to FIG. 10 and FIG. 11, in some embodiments, the gas-ventilating member 2422 includes a layer of gas-ventilating film, a surface of the gas-ventilating film facing the inside of the battery cell is attached to the first connecting member 2421*a*, and a surface of the gas-ventilating film facing away from the inside of the battery cell is attached to the second connecting member 2421*b*.

Optionally, the gas-ventilating member 2422 can be a layer of gas-ventilating film. The gas-ventilating film can be attached to the first connecting member 2421*a* on the upper and lower surfaces of the first through hole 2423 in the axial direction X, and the upper surface of the gas-ventilating film in the axial direction X can be attached to the second connecting member 2421*b*.

Optionally, the upper and lower surfaces of the gas-ventilating film may contain a polar functional group, and can be combined with the first connecting member 2421*a* and the second connecting member 2421*b* through the chemical bond, the van der Waals force and the like, so that it can ensure the bonding strength between the gas-ventilating film and the first connecting member 2421*a* and the second connecting member 2421*b*.

Figure 12:
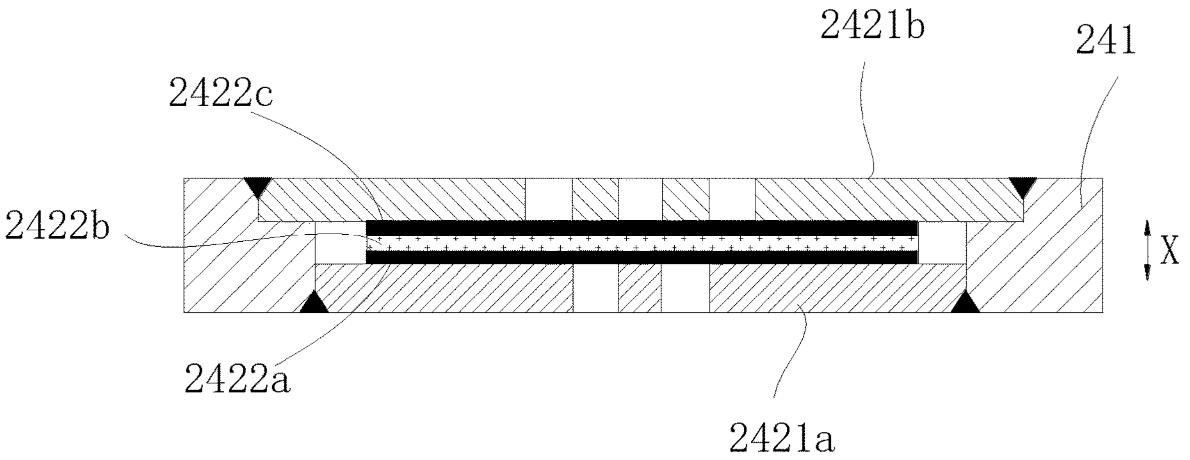
FIG. 12 shows a structural view of a gas-ventilating member according to some embodiments of the present application.
Figure 13:
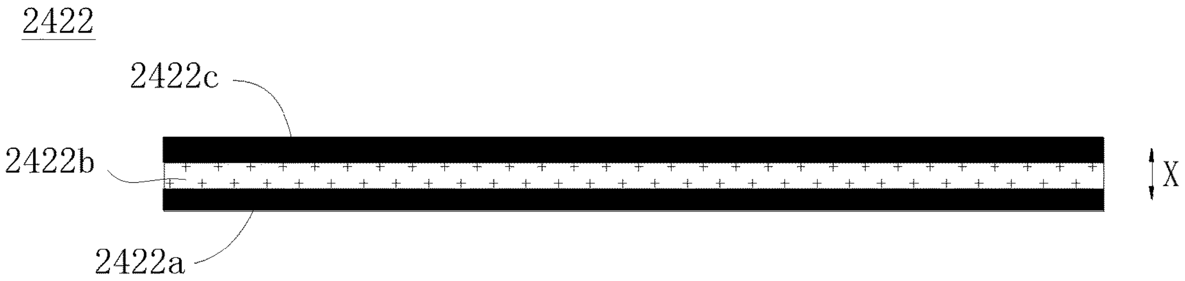
FIG. 13 shows a structural schematic view of a gas-ventilating member according to another embodiments of the present application.

Referring to FIG. 12 and FIG. 13, in some embodiments, the gas-ventilating member 2422 includes a first gas-ventilating film 2422*a*, a second gas-ventilating film 2422*b* and a third gas-ventilating film 2422*c* arranged to be stacked with one another in an axial direction X of the first through hole 2423, a surface of the first gas-ventilating film 2422*a* facing the inside of the battery cell is attached to the first connecting member 2421*a*, a surface of the third gas-ventilating film 2422*c* facing away from the inside of the battery cell is attached to the second connecting member 2421*b*, and a gas-ventilating amount of the second gas-ventilating film 2422*b* can be greater than a gas-ventilating amount of the first gas-ventilating film 2422*a* and a gas-ventilating amount of the third gas-ventilating film 2422*c*.

Optionally, the first gas-ventilating film 2422*a*, the second gas-ventilating film 2422*b* and the third gas-ventilating film 2422*c* can be stacked with one another in the axial direction X of the first through hole 2423, the first gas-ventilating film 2422*a*, the second gas-ventilating film 2422*b* and the third gas-ventilating film 2422*c* may be connected with one another, of course, they may be only stacked with one another without being connected with one another.

Optionally, a surface of the first gas-ventilating film 2422*a* facing the first connecting member 2421*a* and a surface of the third gas-ventilating film 2422*c* facing the second connecting member 2421*b* may contain the polar functional group, so as to combine with the corresponding first connecting member 2421*a* and the second connecting member 2421*b* through the chemical bond, the van der Waals force and the like. Herein, the gas-ventilating amount of the second gas-ventilating film 2422*b* can be greater than the gas-ventilating amount of the first gas-ventilating film 2422*a* and the gas-ventilating amount of the third gas-ventilating film 2422*c*.

In the above technical solution, the first gas-ventilating film 2422*a* can be closely connected with the first connecting member 2421*a*, the third gas-ventilating film 2422*c* can be closely connected with the second connecting member 2421*b*, so as to realize better double sealing, improve the gas tightness of the inside the battery, reduce the risk of the internal leakage and largely improve the reliability of the overall structure. The gas-ventilating amount of the second gas-ventilating film 2422*b* can be greater than the gas-ventilating amount of the first gas-ventilating film 2422*a* and the gas-ventilating amount of the third gas-ventilating film 2422*c*, so that it can increase the gas-ventilating amount of the overall gas-ventilating member 2422, make up for the attenuation of the gas-ventilating amount caused by the path becoming longer due to the gas diffusion and being blocked by the staggered through holes during exhausting the gas, maintain or improve the original gas-ventilating amount, and ensure the safety of inside of the battery.

In some embodiments, a melting point of the second gas-ventilating film 2422*b* can be higher than a melting point of the first gas-ventilating film 2422*a* and a melting point of the third gas-ventilating film 2422*c*.

The selected melting point of the second gas-ventilating film can be arranged to be higher than the melting point of the first gas-ventilating film 2422*a* and the melting point of the third gas-ventilating film 2422*c*. The embodiments of the present application do not limit the composition materials of the first gas-ventilating film 2422*a*, the second gas-ventilating film 2422*b* and the third gas-ventilating film 2422*c*, as long as it is ensured that the thermosetting property of the second gas-ventilating film 2422*b* can be greater than the thermosetting property of the first gas-ventilating film 2422*a* and the thermosetting property of the gas-ventilating film 2422*a* under the same environment.

The second gas-ventilating film 2422*b* can be arranged to the higher melting point, so that it can prevent the second gas-ventilating film 2422*b* from being easily plastically deformed, serve as a support pillar for the overall gas-ventilating member 2422, prevent collapse at the edge of the aperture when the gas-ventilating member 2422 is thermally composited with the connecting assembly 2421, and improve the stability of the overall gas-ventilating member 2422.

Figure 14:
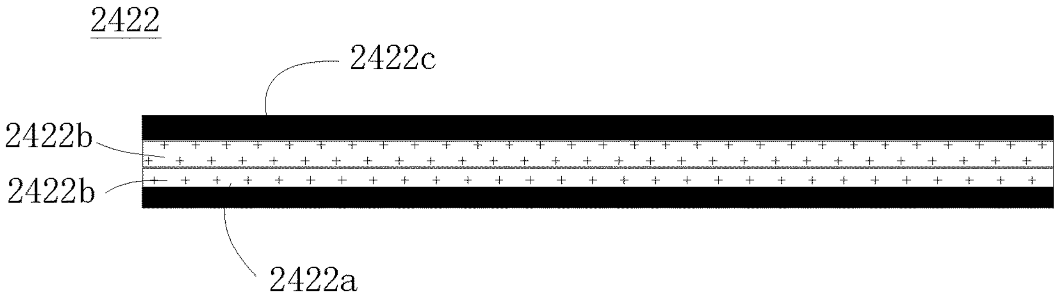
FIG. 14 shows a structural schematic view of a gas-ventilating member according to another embodiments of the present application.

Referring to FIG. 14, in some embodiments, two or more layers of the second gas-ventilating films 2422*b* are provided, the two or more layers of the second gas-ventilating films 2422*b* are located between the first gas-ventilating film 2422*a* and the third gas-ventilating film 2422*c*, and the two or more layers of second gas-ventilating films 2422*b* are stacked in the axial direction X.

The number of the second gas-ventilating film 2422*b* can be arranged to be two or more layers according to needs. The embodiments of the present application do not limit the specific number of layers provided. The material of each of the layers of the second gas-ventilating film 2422*b* can be the same or different, but each of the layers needs to meet the requirements of the above-mentioned the gas-ventilating amount and the melting point.

The plurality of the layers of gas-ventilating films 2422*b* can be arranged, so that it can improve the service life of the overall gas-ventilating member 2422, add the layer of the replaceable gas-ventilating film, prevent the risk of failure of the single-layer gas-ventilating film, and provide the safety protection for the overall gas-ventilating member 2422. In addition, the plurality of the layers of gas-ventilating films 2422*b* can be flexibly matched and stacked with another, so that it can satisfy the requirements of different gas-ventilating amounts and thermoset properties of the gas-ventilating mechanism, and improve the flexibility of gas-ventilating design.

In some embodiments, the gas-ventilating member 2422 can be connected to at least one of the first connecting member 2421*a* and the second connecting member 2421*b* through the chemical bond.

The chemical bond is a collective term for the strong interaction between two or more adjacent atoms (or ions) in a molecule of a pure substance or in a crystal. The force that hold the ions together or the atoms together are known as the chemical bond.

The gas-ventilating member 2422 can be connected to the connecting assembly 2421 through the chemical bond, so that it can make the connection between the gas-ventilating member 2422 and the connecting assembly 2421 more firm and ensure the connection strength of between the gas-ventilating member 2422 and the connecting assembly 2421; at the same time, the influence on the performance of the gas-ventilating member 2422 can be minimized, and the performance of the ventilation member 2422 can be guaranteed. In addition, the connection by the chemical bond is adopted, so that it can prevent the electrolyte from passing through an attachment gap formed between the gas-ventilating member 2422 and the first connecting member 2421*a* or the second connecting member 2421*b*, thereby avoiding the contact or immersion of the electrolyte with a port of the gas-ventilating member 2422, and avoiding the swelling of the gas-ventilating member 2422.

Figure 15:
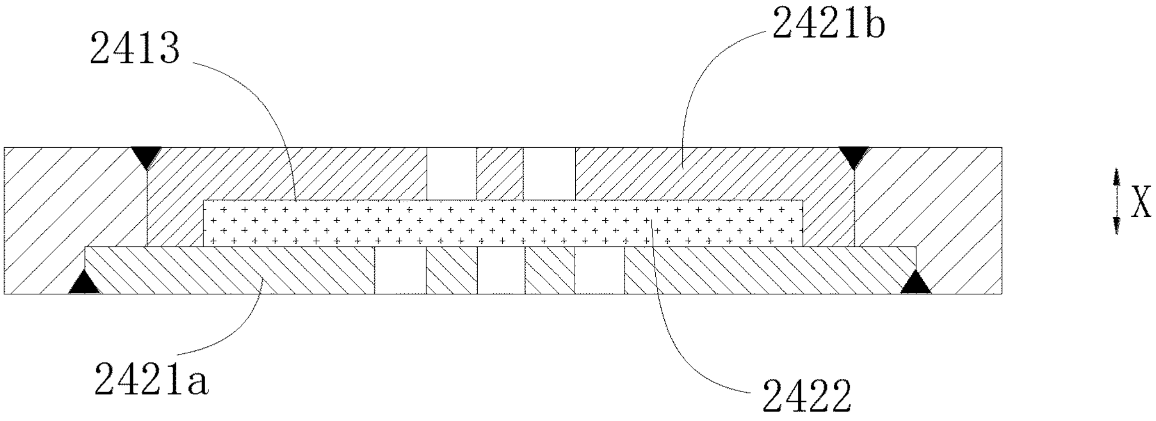
FIG. 15 shows a cross-sectional view of a gas-exhausting apparatus according to another embodiments of the present application.
Figure 16:
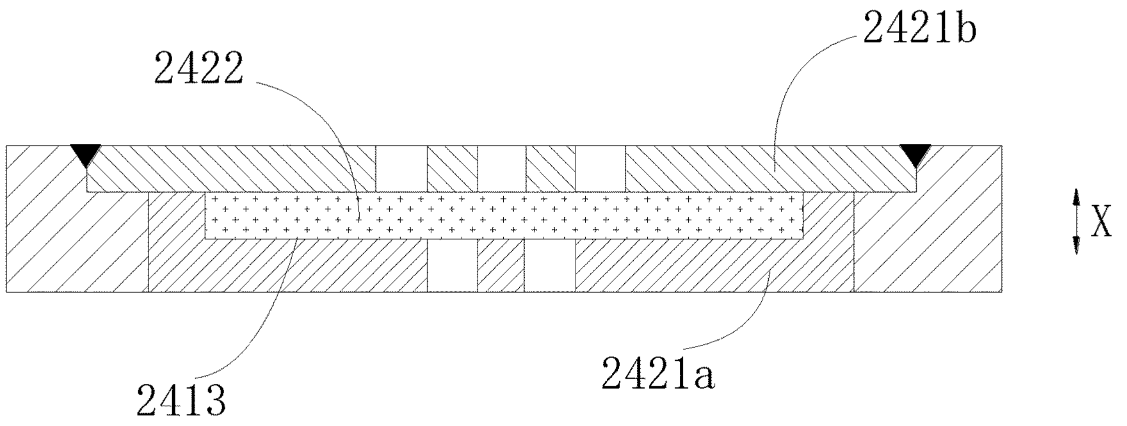
FIG. 16 shows a cross-sectional view of a gas-exhausting apparatus according to another embodiments of the present application.

Referring to FIG. 15 and FIG. 16, in some embodiments, a second concave portion 2413 can be provided on one of the first connecting member 2421*a* and the second connecting member 2421*b*, the second concave portion 2413 can be formed by depressing a surface of one of the first connecting member 2421*a* and the second connecting member 2421*b* in a direction away from the other one, the gas-ventilating member 2422 can be at least partially accommodated in the second concave portion 2413, and each of a bottom wall and a side wall of the second concave portion 2413 abuts against the gas-ventilating member 2422.

As shown in FIG. 15, the second concave portion 2413 may be arranged on the second connecting member 2421*b*. Certainly, as shown in FIG. 16, the second concave portion 2413 may be arranged on the first connecting member 2421*a*.

The gas-ventilating member 2422 can be partially accommodated in the second concave portion 2413, and can also be completely accommodated in the second concave portion 2413.

The first connecting member 2421*a* or the second connecting member 2421*b* can be provided with the second concave portion 2413. The second concave portion 2413 can form the certain accommodating space. The gas-ventilating member 2422 can be arranged in the second concave portion 2413. The gas-ventilating member 2422 merely needs to be in contact with the bottom wall and the side wall of the second concave portion 2413, and does not need to attach to the gas-ventilating body 241. It is only needed to attach the connecting assembly 2421 to the gas-ventilating body 241, and the present application does not limit an abutting-against manner between the connecting assembly 2421 and the gas-ventilating body 241.

In the above technical solution, it can facilitate the positioning of the gas-ventilating member 2422, and prevent the gas-ventilating member 2422 from moving in the radial direction of the first through hole 2423. Thus, the gas-ventilating member 2422 does not need to be directly connected to the gas-exhausting body 241, only at least one of the first connecting member 2421*a* and the second connecting member 2421*b* need to be weldedly connected to the gas-exhausting body 241, so that it can simplify the assembly and connection process, the gas-ventilating member 2422 can be better fixed in the second concave portion 2413, so as to make it more stable. Furthermore, an assembly structure can be provided for the integral gas-exhausting mechanism, which can facilitate flexible design and assembly.

Figure 17:
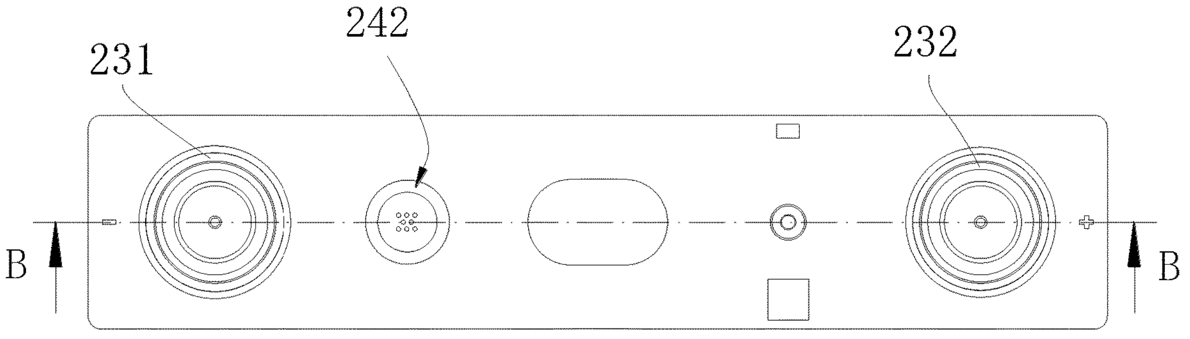
FIG. 17 shows a top view of a gas-exhausting apparatus according to another embodiments of the present application.
Figure 18:
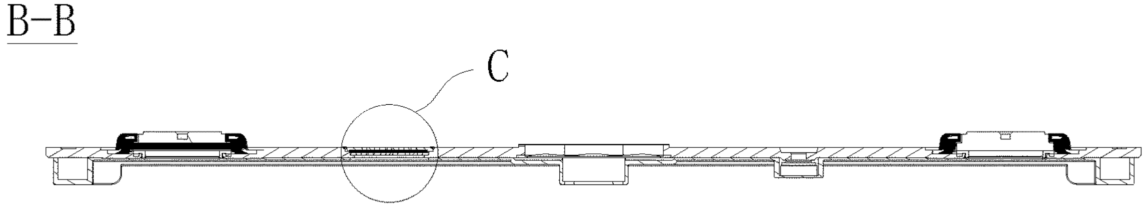
FIG. 18 shows a sectional view in a B-B direction in FIG. 17.
Figure 19:
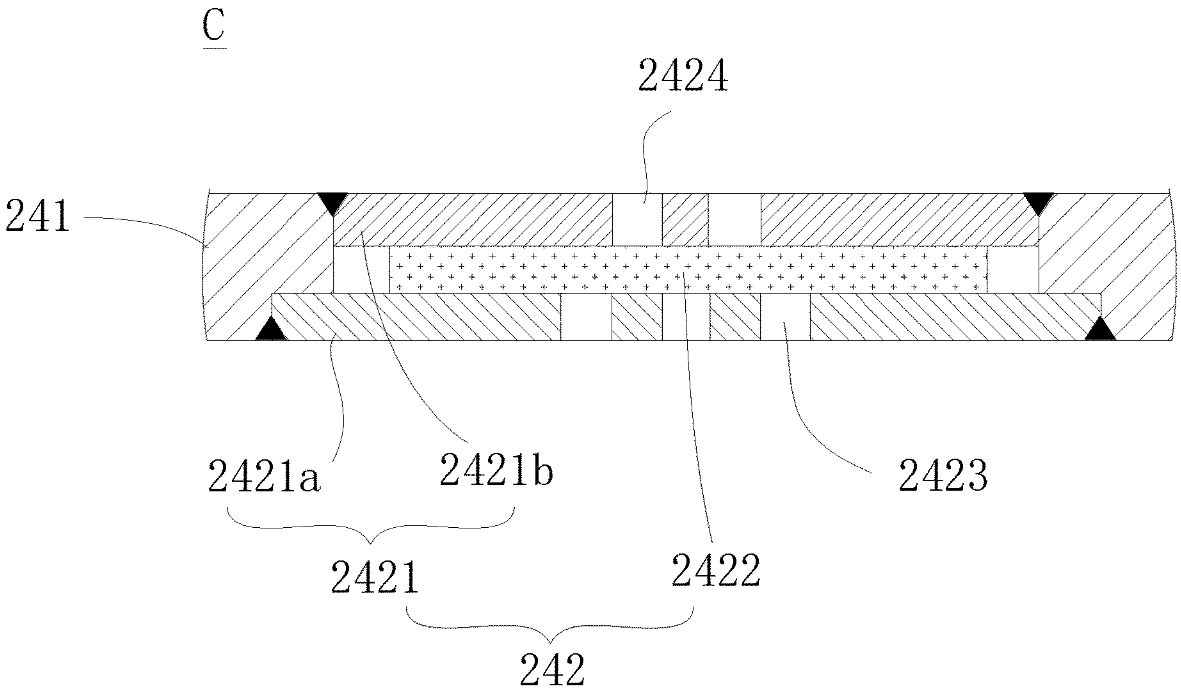
FIG. 19 shows an enlarged view at a C portion in FIG. 18.

Referring to FIG. 17 to FIG. 19, in some embodiments, the gas-exhausting body 241 can be an end cover 23 of the battery cell 20, that is, the gas-exhausting apparatus 24 may be arranged at a position of the end cover 23 of the battery cell 20.

In the above technical solution, the overall end cover 23 of the battery cell 20 can integrate the gas-exhausting function, so that it can ensure the safety performance of the battery cell 20.

It can be understood that, each of the above-mentioned embodiments is illustrated by taking the gas-exhausting body 241 as the end cover 23 of the battery cell 20 as an example.

Figure 20:
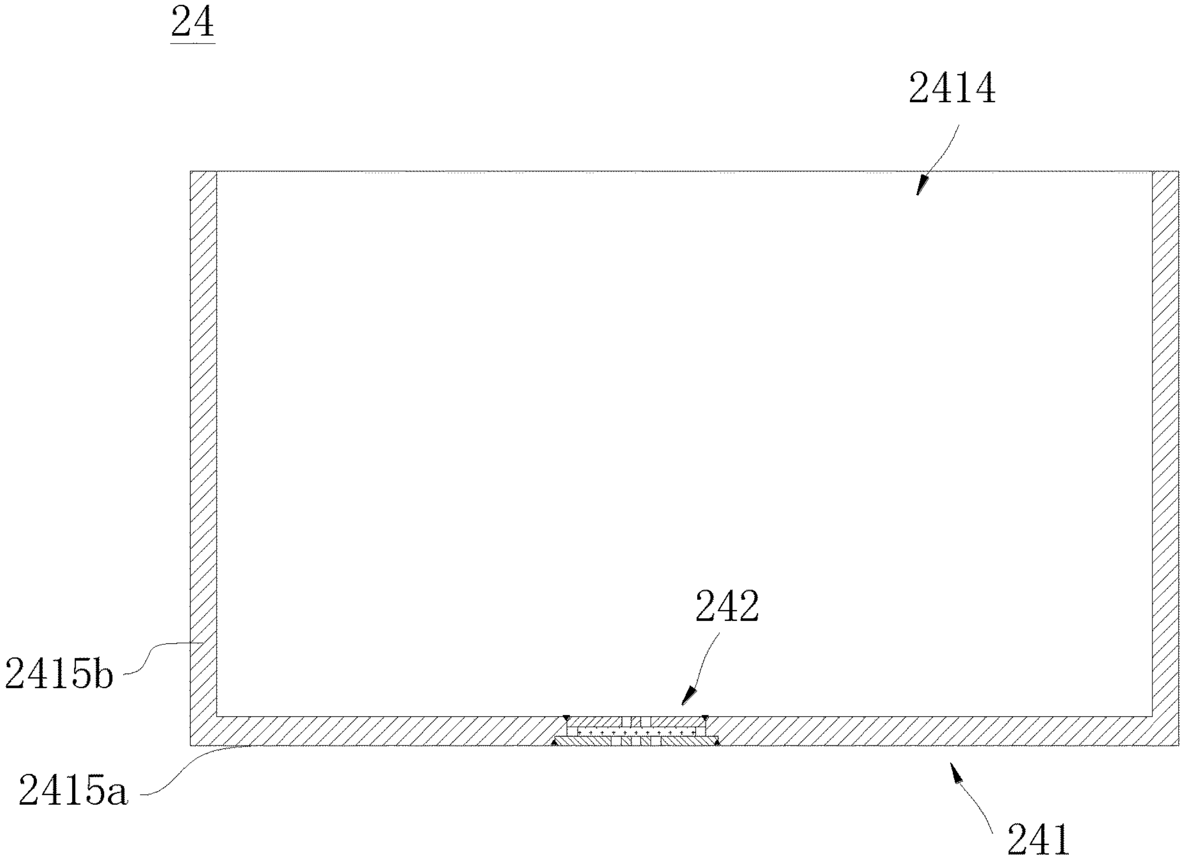
FIG. 20 shows a cross-sectional view of a gas-exhausting apparatus according to another embodiments of the present application.

Referring to FIG. 20, in some embodiments, an accommodating cavity 2414 can be formed at an inside of the gas-exhausting body 241, the gas-exhausting body 241 may include a plurality of walls defining the accommodating cavity 2414, and at least one of the walls can be provided with the gas-exhausting mechanism 242.

At least one wall of the gas-exhausting body 241 can be provided with the gas-exhausting mechanism 242; the gas-exhausting mechanism 242 may be provided on only one wall, or the gas-exhausting mechanism 242 may be provided on the plurality of walls. The gas-exhausting mechanism 242 can be arranged on an outer surface of the wall, or on an inner surface of the wall.

The gas-exhausting body 241 can be in various shapes, such as cuboid and cylinder. Taking the shape of the gas-exhausting body 241 as the cuboid as an example, the gas-exhausting body 241 may include five walls, a bottom wall 2415*a* and four side walls 2415*b* jointly enclose and form the accommodating chamber 2414 with an opening end, and the gas-exhausting mechanism 242 can be arranged on the bottom wall 2415*a*. Taking the shape of the gas-exhausting body 241 as the cylinder as an example, the gas-exhausting body 241 may include two walls: a bottom wall 2415*a* and a circumferential wall, the circumferential wall can be enclosed and arranged at the edge of the bottom wall 2415*a*, the circumferential wall and the bottom wall

2415*a* jointly enclose and form the accommodating chamber 2414 with an opening end, and the gas-exhausting body 241 can be arranged on the bottom wall 2415*a*.

In this embodiment, the accommodating cavity 2414 for accommodating the electrode assembly 22 can be formed at the inside of the exhaust body 241, and the accommodating cavity 2414 can be defined by the plurality of walls of the gas-exhausting body 241, so that the gas-exhausting apparatus 24 may be a housing body 21 capable of accommodating the electrode assembly 22, and the gas-exhausting apparatus 24 can integrate the functions of accommodating and releasing press.

The battery cell 20 provided by the present application may include the gas-exhausting apparatus 24 according to any one of embodiments as described above.

The battery provided by the present application may include the housing body and the battery cell 20 according to any one of embodiments as described above, and the housing body may be configured to accommodate the battery cell 20.

An electricity-consuming apparatus provided by the present application may include the battery according to any one of embodiments as described above, and the battery may be configured to provide an electric power.

Figure 21:
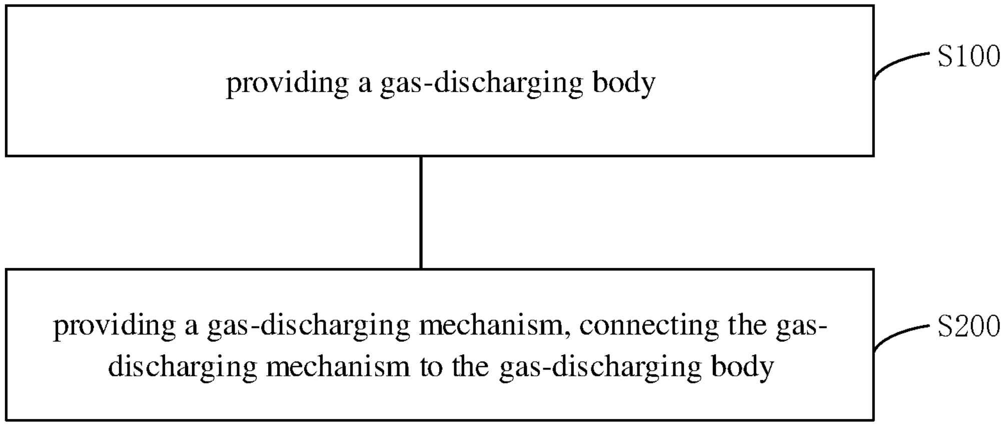
FIG. 21 shows a flow chart of a method of manufacturing a gas-exhausting apparatus according to another embodiments of the present application.

Referring to FIG. 21, a method of manufacturing the gas-exhausting apparatus 24 provided by the present application may include:

S100: providing the gas-exhausting body 241; and

S200: providing the gas-exhausting mechanism 242, and connecting the gas-exhausting mechanism 242 to the gas-exhausting body 241;

Herein, the gas-exhausting mechanism 242 may include the connecting assembly 2421 and the gas-ventilating member 2422; the connecting assembly 2421 may be configured to connect the gas-exhausting body 241; the connecting assembly 2421 may include the first connecting member 2421*a* and the second connecting member 2421*b*; the first connecting member 2421*a* may be provided with the first through hole 2423 for communicating with the inside of the battery cell; the second connecting member 2421*b* may be provided with the second through hole 2424 for communicating with the outside of the battery cell; the gas-ventilating member 2422 may be configured to communicate with the first through hole 2423 and the second through hole 2424 and exhaust gas to the outside of the battery cell through the first through hole 2423 and the second through hole 2424 when a gas pressure of the inside of the battery cell reaches a threshold value; the first connecting member 2421*a* may be configured to attach to the surface of the gas-ventilating member 2422 facing the inside of the battery cell, the second connecting member 2421*b* may be configured to attach to the surface of the gas-ventilating member 2422 facing away from the inside of the battery cell, and an orthographic projection of the first through hole 2423 on the gas-ventilating member 2422 and an orthographic projection of the second through hole 2424 on the gas-ventilating member 2422 are arranged to be staggered from each other, so as to restrict the deformation of the gas-ventilating member 2422.

The method of manufacturing the gas-exhausting apparatus 24 provided by the embodiment of the present application can be applied to form the gas-exhausting apparatus 24 provided by the above-mentioned embodiments. Since the manufactured gas-exhausting apparatus 24 may include the first connecting member 2421*a* and the second connecting member 2421*b*, each of them can be connected to the gas-exhausting body 241, so that the inside of the battery can be double-sealed, the gas tightness of the inside of the battery can be ensured and the risk of leakage can be reduced. the first connecting member 2421*a* may be configured to attach to the surface of the gas-ventilating member 2422 facing the inside of the battery cell, the second connecting member 2421*b* may be configured to attach to the surface of the gas-ventilating member 2422 facing away from the inside of the battery cell, and an orthographic projection of the first through hole 2423 on the gas-ventilating member 2422 and an orthographic projection of the second through hole 2424 on the gas-ventilating member 2422 are arranged to be staggered from each other. Therefore, when the gas acts on the gas-ventilating member 2422 during the exhausting process, acting forces opposite to the gas pressure of the inside of the battery cell can be provided to the gas-ventilating member 2422 through the first connecting member 2421*a* and the second connecting member 2421*b*, respectively, so that it can reduce the probability of deformation or creep of the gas-ventilating member 2422 due to gas pressure during the exhausting process, reduce the failure risk of the gas-ventilating member 2422 due to the fatigue creep, and improve the safety performance and the reliability of the battery cell applying the gas-exhausting apparatus.

Figure 22:
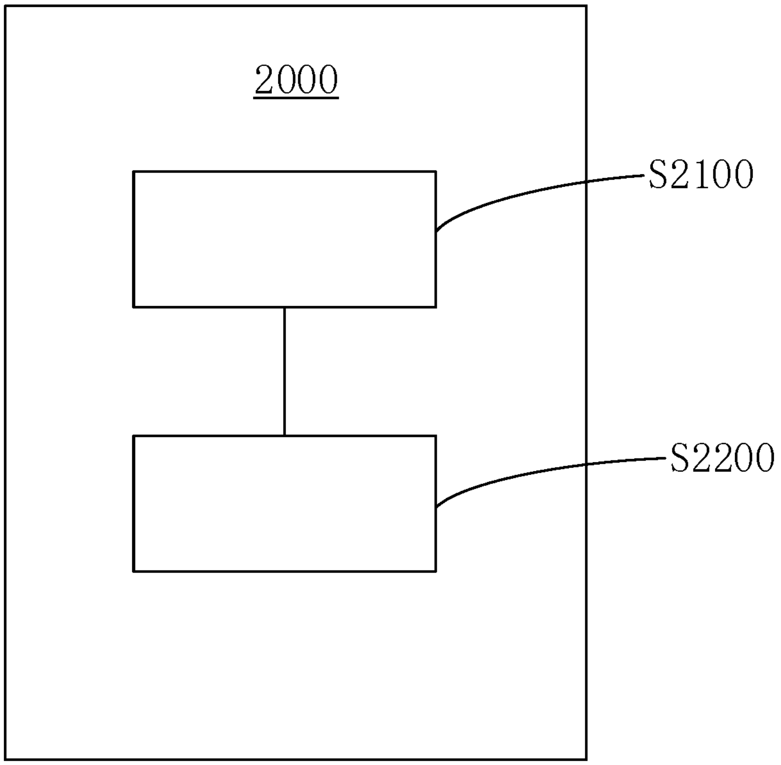
FIG. 22 shows a schematic block view of a device of manufacturing a gas-exhausting apparatus according to some embodiments of the present application.

Referring to FIG. 22, a device of manufacturing the gas-exhausting apparatus 24 provided by the present application may include: a providing apparatus 2100 and an assembling apparatus 2200. The providing apparatus 2100 may be configured to provide the gas-exhausting body 241; and the assembling apparatus 2200 may be configured to provide the gas-exhausting mechanism 242 and connect the gas-exhausting mechanism 242 to the gas-exhausting body 241. Herein, the gas-exhausting mechanism 242 may include the connecting assembly 2421 and the gas-ventilating member 2422; the connecting assembly 2421 may be configured to connect the gas-exhausting body 241; the connecting assembly 2421 may include the first connecting member 2421*a* and the second connecting member 2421*b*; the first connecting member 2421*a* may be provided with the first through hole 2423 for communicating with the inside of the battery cell; the second connecting member 2421*b* may be provided with the second through hole 2424 for communicating with the outside of the battery cell; the gas-ventilating member 2422 may be configured to communicate with the first through hole 2423 and the second through hole 2424 and exhaust gas to the outside of the battery cell through the first through hole 2423 and the second through hole 2424 when a gas pressure of the inside of the battery cell reaches a threshold value; the first connecting member 2421*a* may be configured to attach to the surface of the gas-ventilating member 2422 facing the inside of the battery cell, the second connecting member 2421*b* may be configured to attach to the surface of the gas-ventilating member 2422 facing away from the inside of the battery cell, and an orthographic projection of the first through hole 2423 on the gas-ventilating member 2422 and an orthographic projection of the second through hole 2424 on the gas-ventilating member 2422 are arranged to be staggered from each other, so as to restrict the deformation of the gas-ventilating member 2422.

The device of manufacturing the gas-exhausting apparatus 24 provided by the embodiment of the present application can be applied to manufacture the gas-exhausting apparatus 24 provided by the above-mentioned embodiments. Since the manufactured gas-exhausting apparatus 24 may include the first connecting member 2421*a* and the second connecting member 2421*b*, each of them can be connected to the gas-exhausting body 241, so that the inside of the battery can be double-sealed, the gas tightness of the inside of the battery can be ensured and the risk of leakage can be reduced. the first connecting member 2421*a* may be configured to attach to the surface of the gas-ventilating member 2422 facing the inside of the battery cell, the second connecting member 2421*b* may be configured to attach to the surface of the gas-ventilating member 2422 facing away from the inside of the battery cell, and an orthographic projection of the first through hole 2423 on the gas-ventilating member 2422 and an orthographic projection of the second through hole 2424 on the gas-ventilating member 2422 are arranged to be staggered from each other. Therefore, when the gas acts on the gas-ventilating member 2422 during the exhausting process, acting forces opposite to the gas pressure of the inside of the battery cell can be provided to the gas-ventilating member 2422 through the first connecting member 2421*a* and the second connecting member 2421*b*, respectively, so that it can reduce the probability of deformation or creep of the gas-ventilating member 2422 due to gas pressure during the exhausting process, reduce the failure risk of the gas-ventilating member 2422 due to the fatigue creep, and improve the safety performance and the reliability of the battery cell applying the gas-exhausting apparatus.

It should be noted that, in the case of no conflict, the embodiments in the present application and the features in the embodiments can be combined with one another.

The above embodiments are merely used to illustrate the technical solutions of the present application, and are not intended to restrict the present application. For those skilled in the art, various modifications and changes can be made to the present application. Any modifications, equivalent replacements, improvements and the like made within the gist and principles of the present application shall be included within the protection scope of the present application.

What is claimed is:

1. A gas-exhausting apparatus for a battery cell, comprising:

a gas-exhausting body; and a gas-exhausting mechanism, arranged in the gas-exhausting body, wherein:

the gas-exhausting mechanism comprises a connecting assembly and a gas-ventilating member;

the connecting assembly is configured to connect the gas-exhausting body;

the connecting assembly comprises a first connecting member and a second connecting member;

the first connecting member is provided with a first through hole for communicating with an inside of the battery cell;

the second connecting member is provided with a second through hole for communicating with an outside of the battery cell;

the gas-ventilating member is configured to communicate with the first through hole and the second through hole and exhaust gas to the outside of the battery cell through the first through hole and the second through hole when a gas pressure of the inside of the battery cell reaches a threshold value;

the first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other;

the gas-ventilating member comprises a first gas-ventilating film, a second gas-ventilating film, and a third gas-ventilating film arranged to be stacked with one another in an axial direction of the first through hole, a surface of the first gas-ventilating film facing the inside of the battery cell is attached to the first connecting member, a surface of the third gas-ventilating film facing away from the inside of the battery cell is attached to the second connecting member, and a gas-ventilating amount of the second gas-ventilating film is greater than a gas-ventilating amount of the first gas-ventilating film and a gas-ventilating amount of the third gas-ventilating film;

the gas-ventilating member is configured to permit gas inside the battery cell to flow to the outside of the battery cell, while preventing water vapor outside the battery cell from entering the inside of the battery cell; and the first through hole is one of a plurality of first through holes distributed to be spaced apart from one another on the first connecting member, a connecting portion being formed between two adjacent first through holes, and the connecting portion being attached to the surface of the gas-ventilating member facing the inside of the battery cell through an adhesion connection or a chemical bond connection.

2. The gas-exhausting apparatus according to claim 1, wherein the first connecting member comprises a main body region and a gas-exhausting region, the main body region is configured to connect the gas-exhausting body, the gas-exhausting region comprises the plurality of first through holes and the connecting portion, one part of the surface of the gas-ventilating member facing the inside of the battery cell is attached to the main body region, another part of the surface of the gas-ventilating member is attached to the connecting portion, and an orthographic projection of at least one of the main body region and the connecting portion on the gas-ventilating member covers the orthographic projection of the second through hole on the gas-ventilating member.

3. The gas-exhausting apparatus according to claim 1, wherein the second through hole is one of a plurality of second through holes distributed to be spaced apart from one another on the second connecting member, a connecting portion is formed between two adjacent second through holes, and the connecting portion is configured to attach to the surface of the gas-ventilating member facing away from the inside of the battery cell.

4. The gas-exhausting apparatus according to claim 3, wherein the second connecting member comprises a main body region and a gas-exhausting region, the main body region is configured to connect the gas-exhausting body, the gas-exhausting region comprises the plurality of second through holes and the connecting portion, one part of the gas-ventilating member facing away from the inside of the battery cell is attached to the main body region, another part of the gas-ventilating member is attached to the connecting portion, and an orthographic projection of at least one of the main body region and the connecting portion on the gas-ventilating member covers the orthographic projection of the first through hole on the gas-ventilating member.

5. The gas-exhausting apparatus according to claim 1, wherein the gas-exhausting body is provided separately from the gas-exhausting mechanism, and the gas-exhausting mechanism is connected to the gas-exhausting body through at least one of the first connecting member and the second connecting member.

6. The gas-exhausting apparatus according to claim 5, wherein the gas-exhausting body comprises a third through hole extending in an axial direction of the first through hole, and the third through hole is configured to accommodate at least a part of the gas-exhausting mechanism.

7. The gas-exhausting apparatus according to claim 6, wherein the third through hole is a stepped hole, the third through hole comprises a first hole segment, a second hole segment, and a first stepped surface, the first stepped surface connects a hole wall of the first hole segment with a hole wall of the second hole segment, and the first stepped surface is configured to support one of the first connecting member and the second connecting member.

8. The gas-exhausting apparatus according to claim 7, wherein the third through hole further comprises a third hole segment and a second stepped surface, the second stepped surface connects the hole wall of the second hole segment with a hole wall of the third hole segment, and the second stepped surface is configured to support other one of the first connecting member and the second connecting member.

9. The gas-exhausting apparatus according to claim 1, wherein:

the gas-exhausting body comprises a concave portion formed by concaving either the surface of the gas-exhausting body facing away from the inside of the battery cell or the surface of the gas-exhausting body facing toward the inside of the battery cell, and the concave portion having a bottom wall and a surrounding side wall, one of the first connecting member and the second connecting member is formed on a bottom wall of the concave portion, the gas-ventilating member is located in the concave portion, and other one of the first connecting member and the second connecting member is at least partially located in the concave portion and provided separately from the gas-exhausting body; and/or at least one of the first connecting member and the second connecting member is weldedly connected to the gas-exhausting body, and a gap is formed between the gas-ventilating member and the gas-exhausting body in a radial direction of the first through hole.

10. The gas-exhausting apparatus according to claim 1, wherein:

a melting point of the second gas-ventilating film is higher than a melting point of the first gas-ventilating film and a melting point of the third gas-ventilating film; and/or the second gas-ventilating film is one of two or more second gas-ventilating films located between the first gas-ventilating film and the third gas-ventilating film, the two or more second gas-ventilating films being stacked in the axial direction.

11. The gas-exhausting apparatus according to claim 1, wherein the gas-ventilating member is connected to at least one of the first connecting member and the second connecting member through a chemical bond; and/or a concave portion is provided in one of the first connecting member and the second connecting member, the concave portion is formed by depressing a surface of the one of the first connecting member and the second connecting member in a direction away from the other one, the gas-ventilating member is at least partially accommodated in the concave portion, and each of a bottom wall and a side wall of the concave portion abuts against the gas-ventilating member.

12. A battery cell, comprising the gas-exhausting apparatus according to claim 1.

13. A battery, comprising:

the battery cell according to claim 12, and a housing body, configured to accommodate the battery cell.

14. An electricity-consuming apparatus, comprising the battery according to claim 13, wherein the battery is configured to provide an electric power.

15. The gas-exhausting apparatus according to claim 1, wherein an accommodating cavity is formed at an inside of the gas-exhausting body, the gas-exhausting body comprises a plurality of walls forming the accommodating cavity, and at least one of the walls is provided with the gas-exhausting mechanism.

16. The gas-exhausting apparatus according to claim 1, wherein the gas-exhausting body is an end cover of the battery cell.

17. The gas-exhausting apparatus according to claim 10, wherein the two or more second gas-ventilating films are made of a same material.

18. A gas-exhausting apparatus for a battery cell, comprising:

a gas-exhausting body; and a gas-exhausting mechanism, arranged in the gas-exhausting body, wherein:

the gas-exhausting mechanism comprises a connecting assembly and a gas-ventilating member;

the connecting assembly is configured to connect the gas-exhausting body;

the connecting assembly comprises a first connecting member and a second connecting member;

the first connecting member is provided with a first through hole for communicating with an inside of the battery cell;

the second connecting member is provided with a second through hole for communicating with an outside of the battery cell;

the gas-ventilating member is configured to communicate with the first through hole and the second through hole and exhaust gas to the outside of the battery cell through the first through hole and the second through hole when a gas pressure of the inside of the battery cell reaches a threshold value;

the first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other;

the gas-ventilating member comprises a first gas-ventilating film, a second gas-ventilating film, and a third gas-ventilating film arranged to be stacked with one another in an axial direction of the first through hole, a surface of the first gas-ventilating film facing the inside of the battery cell is attached to the first connecting member, a surface of the third gas-ventilating film facing away from the inside of the battery cell is attached to the second connecting member, and a gas-ventilating amount of the second gas-ventilating film is greater than a gas-ventilating amount of the first gas-ventilating film and a gas-ventilating amount of the third gas-ventilating film;

the gas-exhausting body comprises a third through hole extending in an axial direction of the first through hole and configured to accommodate at least a part of the gas-exhausting mechanism, the third through hole being a stepped hole and comprising a first hole segment, a second hole segment, and a first stepped surface, the first stepped surface connecting a hole wall of the first hole segment with a hole wall of the second hole segment, each hole wall being a surface of the gas-exhausting body, and the first stepped surface being configured to support one of the first connecting member and the second connecting member; and the first through hole is one of a plurality of first through holes distributed to be spaced apart from one another on the first connecting member, a connecting portion being formed between two adjacent first through holes, and the connecting portion being attached to the surface of the gas-ventilating member facing the inside of the battery cell through an adhesion connection or a chemical bond connection.

19. A gas-exhausting apparatus for a battery cell, comprising:

a gas-exhausting body; and a gas-exhausting mechanism, arranged in the gas-exhausting body, wherein:

the gas-exhausting mechanism comprises a connecting assembly and a gas-ventilating member;

the connecting assembly is configured to connect the gas-exhausting body;

the connecting assembly comprises a first connecting member and a second connecting member;

the first connecting member is provided with a first through hole for communicating with an inside of the battery cell;

the second connecting member is provided with a second through hole for communicating with an outside of the battery cell;

the gas-ventilating member is configured to communicate with the first through hole and the second through hole and exhaust gas to the outside of the battery cell through the first through hole and the second through hole when a gas pressure of the inside of the battery cell reaches a threshold value;

the first connecting member is configured to attach to a surface of the gas-ventilating member facing the inside of the battery cell, the second connecting member is configured to attach to a surface of the gas-ventilating member facing away from the inside of the battery cell, and an orthographic projection of the first through hole on the gas-ventilating member and an orthographic projection of the second through hole on the gas-ventilating member are arranged to be staggered from each other;

the gas-ventilating member comprises a first gas-ventilating film, a second gas-ventilating film, and a third gas-ventilating film arranged to be stacked with one another in an axial direction of the first through hole, a surface of the first gas-ventilating film facing the inside of the battery cell is attached to the first connecting member, a surface of the third gas-ventilating film facing away from the inside of the battery cell is attached to the second connecting member, and a gas-ventilating amount of the second gas-ventilating film is greater than a gas-ventilating amount of the first gas-ventilating film and a gas-ventilating amount of the third gas-ventilating film; and the gas-exhausting body comprises a third through hole extending in an axial direction of the first through hole and configured to accommodate at least a part of the gas-exhausting mechanism, the third through hole being a stepped hole and comprising a first hole segment, a second hole segment, and a third hole segment, a radial size of the third hole segment being smaller than a smallest radial size of a region of the gas-exhausting mechanism.

* * * * *